(12) United States Patent
Tanimoto

(10) Patent No.: US 8,010,675 B2
(45) Date of Patent: *Aug. 30, 2011

(54) RELAY SERVER AND RELAY COMMUNICATION SYSTEM

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 157 days.

This patent is subject to a terminal disclaimer.

(21) Appl. No.: 12/335,642

(22) Filed: Dec. 16, 2008

(65) Prior Publication Data

US 2009/0164637 A1      Jun. 25, 2009

(30) Foreign Application Priority Data

Dec. 25, 2007   (JP) ................................. 2007-333163

(51) Int. Cl.
*G06F 15/173* (2006.01)
*G06F 15/16* (2006.01)
(52) U.S. Cl. ........ 709/226; 709/203; 709/206; 709/217; 709/225; 709/246; 709/229; 709/230; 709/238
(58) Field of Classification Search .................. 709/203, 709/206, 217, 225, 229, 230, 238, 246, 226; 370/352, 389, 401
See application file for complete search history.

(56) References Cited

U.S. PATENT DOCUMENTS

| 6,650,631 | B1 * | 11/2003 | Benash et al. ................. 370/352 |
| 6,898,641 | B1 | 5/2005 | Kobayashi |
| 6,988,199 | B2 | 1/2006 | Toh et al. |
| 7,139,811 | B2 | 11/2006 | Lev Ran et al. |
| 7,174,378 | B2 | 2/2007 | Yoon et al. |
| 7,412,489 | B2 * | 8/2008 | Nowacki et al. ............... 709/206 |
| 7,574,523 | B2 * | 8/2009 | Traversat et al. ............. 709/238 |
| 7,701,954 | B2 * | 4/2010 | Rabenko et al. ............. 370/401 |
| 7,774,495 | B2 * | 8/2010 | Pabla et al. .................... 709/238 |
| 2001/0047414 | A1 | 11/2001 | Yoon et al. |
| 2002/0143855 | A1 * | 10/2002 | Traversat et al. ............. 709/202 |

(Continued)

FOREIGN PATENT DOCUMENTS

EP        1 990 974 A2     11/2008

(Continued)

OTHER PUBLICATIONS

Shinji Okumura et al., SIP (session initiation protocol), Nikkei Communications, Sep. 22, 2003, pp. 150-158 (partial translation pp. 155-156 (Usable in IM and Presence Notification)).

(Continued)

*Primary Examiner* — Asad M Nawaz
*Assistant Examiner* — Vitali Korobov
(74) *Attorney, Agent, or Firm* — Keating & Bennett, LLP

(57) ABSTRACT

A relay server that implements a virtual file sharing system includes shared resource and message information that can be managed in an integrated manner, and a user of a client terminal can be appropriately notified of changes of the shared resource, or the like. The relay server includes a shared resource information registration unit, which stores shared resource information when a resource is shared by a plurality of client terminals. The shared resource information includes, for example, resource information, account information of the client terminal that shares the resource, and message information regarding a message exchanged among the client terminals. The relay server includes a control unit, which adds, when the resource becomes sharable or is shared by the client terminal, message information regarding a message notifying of such resource sharability or resource sharing to the shared resource information.

12 Claims, 18 Drawing Sheets

U.S. PATENT DOCUMENTS

| | | | |
|---|---|---|---|
| 2002/0143960 | A1 | 10/2002 | Goren et al. |
| 2002/0146002 | A1 | 10/2002 | Sato |
| 2002/0152299 | A1* | 10/2002 | Traversat et al. ............. 709/223 |
| 2004/0083385 | A1 | 4/2004 | Ahmed et al. |
| 2004/0148432 | A1 | 7/2004 | Udono et al. |
| 2004/0162871 | A1* | 8/2004 | Pabla et al. .................. 709/201 |
| 2004/0255048 | A1 | 12/2004 | Lev Ran et al. |
| 2005/0076098 | A1 | 4/2005 | Matsubara et al. |
| 2005/0256909 | A1 | 11/2005 | Aboulhosn et al. |
| 2006/0083171 | A1 | 4/2006 | Tanaike et al. |
| 2006/0256771 | A1 | 11/2006 | Yarlagadda |
| 2006/0282540 | A1 | 12/2006 | Tanimoto |
| 2007/0022477 | A1 | 1/2007 | Larson |
| 2007/0233844 | A1 | 10/2007 | Tanimoto |
| 2008/0089349 | A1 | 4/2008 | Tanimoto |
| 2008/0098088 | A1 | 4/2008 | Tamano et al. |
| 2008/0288591 | A1 | 11/2008 | Tanimoto |

FOREIGN PATENT DOCUMENTS

| | | | |
|---|---|---|---|
| JP | 04-105143 | A | 4/1992 |
| JP | 2001-292167 | A | 10/2001 |
| JP | 2002-007182 | A | 1/2002 |
| JP | 2002-199150 | A | 7/2002 |
| JP | 2002-217943 | A | 8/2002 |
| JP | 2002-288415 | A | 10/2002 |
| JP | 2002-314573 | A | 10/2002 |
| JP | 2003-032310 | A | 1/2003 |
| JP | 2004-201255 | A | 7/2004 |
| JP | 2004-310371 | A | 11/2004 |
| JP | 2005-027040 | A | 1/2005 |
| JP | 2005-115943 | A | 4/2005 |
| JP | 2006-033105 | A | 2/2006 |
| JP | 2006-268138 | A | 10/2006 |
| JP | 2006-343943 | A | 12/2006 |
| JP | 2007-265135 | A | 10/2007 |
| JP | 2007-267136 | A | 10/2007 |
| JP | 2008-098699 | A | 4/2008 |
| JP | 2008-098888 | A | 4/2008 |
| JP | 2008-148125 | A | 6/2008 |
| JP | 2008-154101 | A | 7/2008 |
| JP | 2008-306500 | A | 12/2008 |
| JP | 2009-027652 | A | 2/2009 |
| JP | 2009-163300 | A | 7/2009 |
| JP | 2009-163302 | A | 7/2009 |
| JP | 2009-252159 | A | 10/2009 |
| JP | 2009-265919 | A | 11/2009 |

OTHER PUBLICATIONS

Tanimoto: "Relay Server and Relay Communication System," U.S. Appl. No. 12/340,868; filed Dec. 22, 2008.

Traversat et al.: Project JXTA 2.0 Super-Peer Virtual Network, XP-002481407; http://research.sun.com/spotlight/misc/jxta.pdf; May 25, 2003; pp. 1-20.

Official communication issued in counterpart European Application No. 08021445.5, mailed on Apr. 24, 2009.

Tanimoto; "Relay-Server"; U.S. Appl. No. 11/853,943, filed Sep. 12, 2007.

Tanimoto; "File Server Device"; U.S. Appl. No. 11/862,654, filed Sep. 27, 2007.

Tanimoto; "File Transfer Server"; U.S. Appl. No. 11/870,622, filed Oct. 11, 2007.

Tanimoto; "Relay Server, Relay Communication System, and Communication Device"; U.S. Appl. No. 11/944,495, filed Nov. 23, 2007.

Tanimoto; "Relay Server and Relay Communication System"; U.S. Appl. No. 11/953,505, filed Dec. 10, 2007.

Tanimoto; "Relay Server and Client Terminal"; U.S. Appl. No. 11/953,351, filed Dec. 10, 2007.

Tanimoto; "Relay Server and Relay Communication System"; U.S. Appl. No. 12/103,933, filed Apr. 16, 2008.

Tanimoto; "Relay Server and Relay Communication System"; U.S. Appl. No. 12/112,127, filed Apr. 30, 2008.

Tanimoto; "Relay Server and Relay Communication System"; U.S. Appl. No. 12/107,793, filed Apr. 23, 2008.

Tanimoto; "Relay Server and Relay Communication System"; U.S. Appl. No. 12/270,883, filed Nov. 14, 2008.

Tanimoto; "Relay Server and Relay Communication System"; U.S. Appl. No. 12/335,661, filed Dec. 16, 2008.

Official Communication issued in U.S. Appl. No. 11/723,466, mailed on Nov. 8, 2010.

Tanimoto; "Relay Device and Communication System"; U.S. Appl. No.11/723,466, filed Mar. 20, 2007.

English translation of Official Communication issued in corresponding Japanese Patent Application No. 2006-334652, mailed on Jun. 8, 2010.

English translation of Official Communication issued in corresponding Japanese Patent Application No. 2007-152122, mailed on Jun. 2, 2010.

Tanimoto, "Relay Server and Relay Communication System", U.S. Appl. No. 13/061,234, filed Feb. 28, 2011.

Tanimoto, "Relay Server, Relay Communication System, and Communication Apparatus", U.S. Appl. No. 13/061,725, filed Mar. 2, 2011.

Official Communication issued in International Patent Application No. PCT/JP2010/001594, mailed on Mar. 30, 2010.

Official Communication issued in International Patent Application No. PCT/JP2010/003240, mailed on Jun. 15, 2010.

Official Communication issued in International Patent Application No. PCT/JP2010/005041, mailed on Nov. 22, 2010.

Official Communication issued in International Patent Application No. PCT/JP2010/005679, mailed on Oct. 26, 2010.

Official Communication issued in International Patent Application No. PCT/JP2010/005680, mailed on Oct. 26, 2010.

Hitoshi, "Network World", vol. 9, No. 12, Dec. 1, 2004, pp. 148-150.

Tanimoto, "Relay Server, Communication System and Facsimile System", U.S. Appl. No. 10/045,698, filed Jan. 10, 2002.

Tanimoto, "Relay Server, Communication System and Facsimile System", U.S. Appl. No. 10/045,897, filed Jan. 10, 2002.

Tanimoto, "Relay Server for Relaying Communications Between Network Devices", U.S. Appl. No. 10/114,720, filed Apr. 1, 2002.

Tanimoto, "Relay Server", U.S. Appl. No. 101114,963, filed Apr. 2, 2002.

Tanimoto, "Relay Server, Network Device, Communication System, and Communication Method", U.S. Appl. No. 10/116,615, filed Apr. 2, 2002.

Official Communication issued in corresponding Japanese Patent Application No. 2007-339311, mailed on Apr. 8, 2011.

"Error & Warning Message Ways of Coping, Nikkei Personal Computer", Nikkei Business Publications, Inc., May 10, 2007.

Official Communication issued in corresponding European Patent Application No. 08007866.0, mailed on Apr. 19, 2011.

* cited by examiner

FIG. 7

```
<?xml version="1.0" encoding="Shift_JIS" ?>                                    ─121
<user-account account="user1A@account">                                         ─122
  <policy name="workspace1" policy-id="20061001150032client11@relay-server1">   ─123
    <family-account-info>
      <user-account account="client11@relay-server1.net"/>  ⎫
      <user-account account="client21@relay-server2.net"/>  ⎬ 124
      <user-account account="client31@relay-server3.net"/>  ⎭
    </family-account-info>
    <family-resource-info>
      ...                                                                      ─125
    </family-resource-info>                              ─130
    <message-root>                                                              ─127(127a)
      <msg id="msg00001" date="20061001150032" account="client11@relay-server1.net">  ─132
        ---MIME MESSAGE---                              ─131
      </msg>                                            ─133(133a)
      <msg id="msg00002" date="20061001150040" account="client11@relay-server1.net">  ─132
        ---MIME MESSAGE---                              ─131
      </msg>                                            ─133(133b)
    </message-root>                                                             ─127(127b)
  </policy>
</user-account>
```

```
<family-resource-info>
  <resource name="folderA" owner="client11@relay-server1.net" value="c:/folderA" status="ok"/>
    <resource name="file00ZX.xls" owner="client11@relay-server1.net" value="//network/z:/folderZ/estimate.xls" status="ok"/>
    <resource name="file00ZY.doc" owner="client11@relay-server1.net" value="//network/z:/folderZ/order.doc" status="ok"/>
  </resource>
  <resource name="folderB" owner="client21@relay-server2.net" value="c:/document" status="ok">
    <resource name="file00A.xls" owner="client21@relay-server2.net" value="c:/document/doc001.xls" status="ok"/>
    <resource name="file00B.doc" owner="client21@relay-server2.net" value="c:/document/doc002.doc" status="ok"/>
  </resource>
</family-resource-info>
```

```
MIME-Version: 1.0
Content-Type: text/plain; charset="ISO-2002-JP"
Content-Transfer-Encoding: 7bit $B!N<F0%a%C%;!<%8!O(B
user1A@relay-server1.net$B$5s$,(B
workspace1$r:n@.$7$S^$7$S?!#(B $B$3$N%a%C%;!<%8SNM-8z4|8BSO#3F|$GS9!#(B
```  } 133 (133a)

```
MIME-Version: 1.0
Content-Type: text/plain; charset="ISO-2002-JP"
Content-Transfer-Encoding: 7bit $B!N<F0%a%C%;!<%8!O(B
user1A@relay-server1.net$B$5s$,(B
"file00ZY.doc"$B$rD!2CS7$^$7$?!#(B $B$3$N%a%C%;!<%8SNM-8z4|8BSO#3F|$GS9!#(B
```  } 133 (133b)

FIG. 13

[AUTOMATIC MESSAGE]
client11@relay-server1.net HAS CREATED workspace1.

THE VALID PERIOD FOR THIS MESSAGE IS THREE DAYS.

FIG. 15

[AUTOMATIC MESSAGE]
client11@relay-server1.net HAS ADDED
"file00ZY.doc".

THE VALID PERIOD FOR THIS MESSAGE IS THREE DAYS.

FIG. 18

| COMMAND TYPE | MESSAGE FORMAT | VALID PERIOD |
|---|---|---|
| CREATION OF WORKSPACE | [AUTOMATIC MESSAGE] <$ACCOUNT NAME$> HAS CREATED <$WORKSPACE NAME$>. THE VALID PERIOD FOR THIS MESSAGE IS <$EXPIRE$>. | THREE DAYS |
| ADDITION OF SHARED RESOURCE | [AUTOMATIC MESSAGE] <$ACCOUNT NAME$> HAS ADDED <$SHARED RESOURCE NAME$>. THE VALID PERIOD FOR THIS MESSAGE IS <$EXPIRE$>. | THREE DAYS |

RELAY SERVER AND RELAY COMMUNICATION SYSTEM

CROSS-REFERENCE TO RELATED APPLICATIONS

This application claims priority under 35 U.S.C. 119 to Japanese Patent Application No. 2007-333163 filed on Dec. 25, 2007, which application is hereby incorporated by reference in its entirety.

BACKGROUND OF THE INVENTION

1. Field of the Invention

The present invention relates to a relay server and a relay communication system that enable resource sharing via a network.

2. Description of the Related Art

A communication system referred to as a Virtual Private Network (VPN) is known in the conventional art. The VPN is used, for example, to provide communication over the Internet between terminals connected to a Local Area Network (LAN) of a plurality of branch offices (base points) established in separate regions. Through the use of the VPN, each client terminal can share various resources (such as folders, files, etc.) held by apparatuses connected to another LAN arranged in a remote location.

A method for transmitting an electronic mail (e-mail) with a proper text message described therein and a file attached thereto, or the like, is commonly used, for example, as a method for exchanging files with a destination located inside and/or outside the VPN. Alternatively, a method for uploading a file by using a File Transfer Protocol (FTP) service and a method for sending by mail a recording medium, such as a CD-Recordable, on which a file is recorded, or the like, are used if necessary.

However, in the method for transmitting the file through the use of the e-mail attachment, it is necessary to both manage the e-mail in a mailbox, and organize and store the attached file in a desired folder each time. Moreover, when a file size is large, a transmitting side is required to set a mail server and to compress or divide the file due to limitations of mailbox sizes. Accordingly, a receiving side is required to perform a decompression process or a connecting process, and such operations have been troublesome.

When using the FTP service, although the service is suitable for the transmission of large files, troublesome operations such as setting up an account for the FTP service have been necessary. Alternatively, when sending the large file recorded on the recording medium such as a CD-Recordable by postal mail, the cost for such a medium and the mailing costs cause an increase in overall costs.

When using the FTP service, mailing method, or other similar method, if a message is desired to be sent along with the file, the message has to be transmitted separately via an e-mail, causing additional troublesome work. Moreover, some messages desired to be sent along with the file can be simple, such as "Attached please find XXX", and the operation for creating such messages each time the file is transmitted have been troublesome when the files are frequently exchanged. Moreover, a party receiving the message and file is required to manage the received file by using file management software such as Explorer and to manage the message by using e-mail software. Therefore, there is room for improvement in terms of simplification of information organization.

SUMMARY OF THE INVENTION

In order to overcome the problems described above, preferred embodiments of the present invention provide a relay server that can implement a virtual file sharing system. Moreover, preferred embodiments of the present invention provide a relay server in which message information is managed in an integrated manner, and in which a user of a client terminal can be appropriately notified of changes in shared resources, or the like.

A preferred embodiment of the present invention provides a relay server that includes a relay group information registration unit arranged to store relay group information, a shared resource information registration unit, and a control unit. The relay group information includes information about a relay group that has other relay servers that can be connected with the relay server. The shared resource information registration unit stores shared resource information when a resource is shared by a plurality of client terminals in the relay group. The shared resource information includes information related to the resource, account information of the client terminal that shares the resource, and message information regarding a message that is exchanged among the plurality of client terminals. The control unit relays an instruction for handling the resource or the message information both registered in the shared resource information registration unit to at least any one of the client terminals to which the relay server is connected or the other relay servers. Moreover, when any of the relay group information, the shared resource information, and the account information of the client terminal is changed, the control unit adds, to the shared resource information, the message information regarding a message notifying such change(s).

With the above-described configuration, the plurality of client terminals can share the resources and exchange the messages with desired destinations via the relay server. Moreover, the messages and the shared resources can be easily managed in an integrated manner. For example, when the relay servers that form the relay group are changed, when the shared resource is handled (i.e., changed, deleted, updated, etc.) by the client terminal, or when the client terminals that share the resource are changed, or the like, the notifying message is automatically added by the relay server. Thus, the client terminals can be notified of such changes etc. without performing special operations.

In the relay server, it is preferable that when at least any of the relay group information, the shared resource information, and the account information of the client terminal is changed, the client terminal can instruct whether or not to notify of such changes through a message.

With the above-described configuration, both a case where the client terminal desires to notify the other client terminals of the handling of the shared resource and a case where such notifications are not necessarily required, for example, can be appropriately dealt with.

In the relay server, it is preferable that the control unit automatically deletes the message information after a prescribed time period elapses from a time when the message information regarding the notifying message is added to the shared resource information.

With the above-described configuration, even when the shared resource is frequently handled, resulting in a great number of notifying messages, an old notifying message having an appropriate period of time elapsed is automatically deleted. Accordingly, a great number of messages having less importance due an elapse of a long period of time can be prevented from being accumulated and thereby complication can be avoided.

In the relay server, it is preferable that when the resource becomes sharable or shared by the client terminal in the relay group, the control unit adds to the shared resource information the message information regarding a message notifying such sharability or sharing.

With the above-described configuration, when the resource becomes sharable, or when the resource is actually shared, the other client terminals are immediately notified of such resource sharability or resource sharing. Thus, cooperative work (joint operations) can be smoothly and effectively achieved via the resource sharing among the plurality of client terminals.

Another preferred embodiment of the present invention provides a relay communication system that includes a plurality of relay servers and a plurality of client terminals. The relay server includes a relay group information registration unit arranged to store relay group information, a shared resource information registration unit, and a control unit. The relay group information includes information about a relay group that has other relay servers that can be connected to the relay server. The shared resource information registration unit stores shared resource information when a resource is shared by the plurality of client terminals in the relay group. The shared resource information includes information related to the resource, account information of the client terminal that shares the resource, and message information regarding a message that is exchanged among the plurality of client terminals. The control unit relays, to at least any one of the client terminals to which the relay server is connected or the other relay servers, an instruction for handling the resource or the message information both registered in the shared resource information registration unit. Moreover, when any of the relay group information, the shared resource information, and the account information of the client terminal is changed, the control unit adds, to the shared resource information, the message information regarding a message notifying such change(s).

With the above-described configuration, the plurality of client terminals can share the resources and exchange the messages with desired destinations via the relay server. Moreover, the messages and the shared resources can be managed in an integrated manner easily. For example, when the relay servers that form the relay group are changed, when the shared resource is handled by the client terminal, or when the client terminals that share the resource are changed, or the like, the notifying message is automatically added by the relay server. Thus, the other client terminals can be notified of such changes etc. without performing special operations.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 7 illustrates a content of shared resource information according to a preferred embodiment of the present invention.

FIG. 8 illustrates a detailed content of family resource information of the shared resource information according to a preferred embodiment of the present invention.

FIG. 9 illustrates in detail message content information of the shared resource information according to a preferred embodiment of the present invention.

FIG. 13 illustrates an example of a notifying message displayed at the client terminal in the process of FIG. 12 according to a preferred embodiment of the present invention.

FIG. 15 illustrates an example of a notifying message displayed at the client terminal in the process of FIG. 14 according to a preferred embodiment of the present invention.

FIG. 18 illustrates an example of a model table that is used to create a notifying message according to a preferred embodiment of the present invention.

DETAILED DESCRIPTION OF PREFERRED EMBODIMENTS

Figure 1:
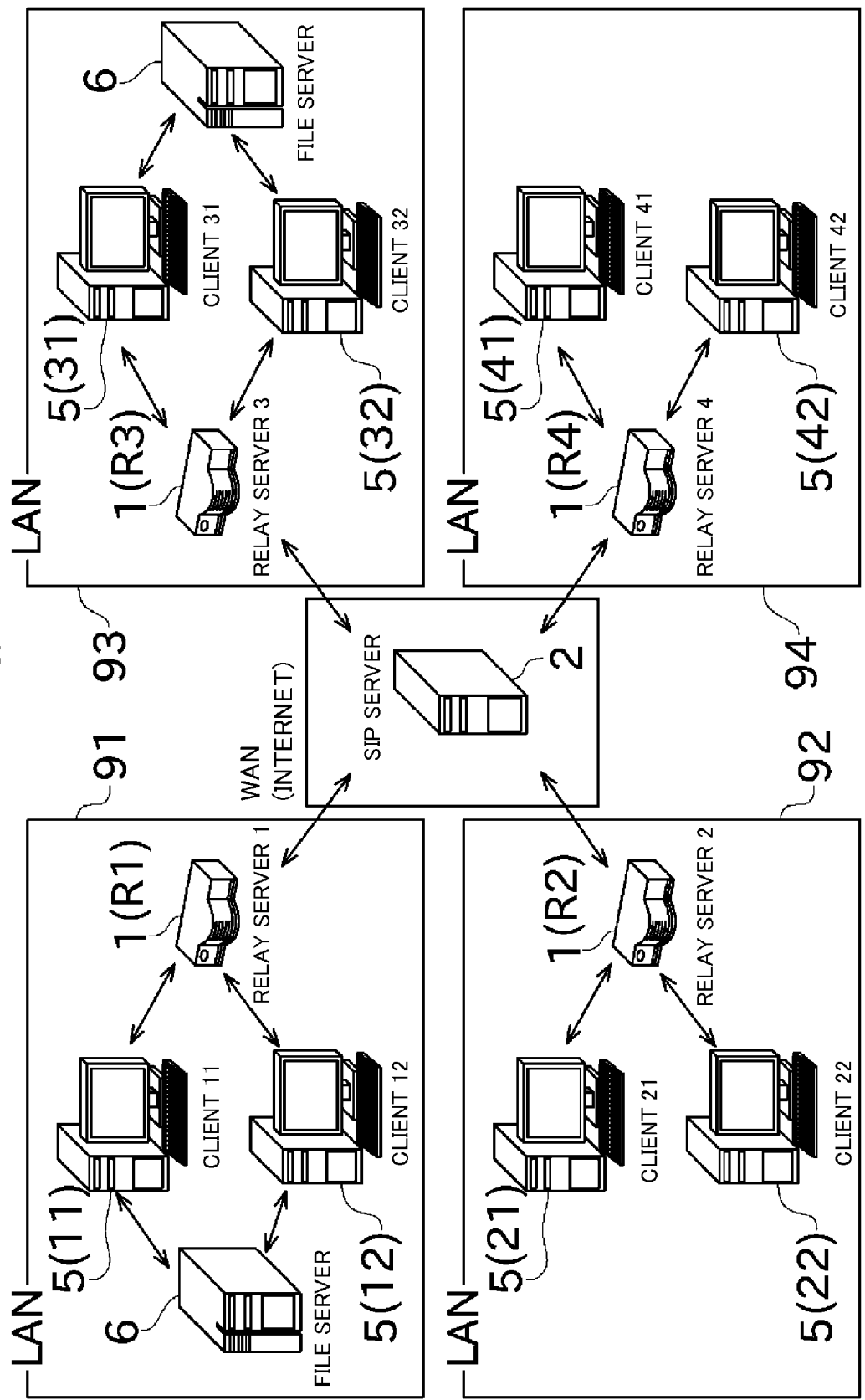
FIG. 1 is a network configuration diagram of a relay communication system according to a preferred embodiment of the present invention.

Preferred embodiments of the present invention will be described with reference to the drawings. FIG. 1 illustrates an overall configuration of a relay communication system according to a preferred embodiment of the present invention.

As illustrated in FIG. 1, the relay communication system of the present preferred embodiment includes a plurality of LANs connected to a Wide Area Network (WAN). The relay communication system includes relay servers 1, an external server 2, client terminals 5, and file servers 6, etc.

The WAN is a network that connects different LANs to each other. In the present preferred embodiment, the Internet is preferably used as the WAN, for example.

The LAN is preferably a relatively small-scale network provided in a limited location. There are a plurality of LANs, each of which is provided at a physically remote location. In the present preferred embodiment, a LAN 91 is provided at, for example, a Tokyo branch office, and LANs 92, 93, 94 are respectively provided at, for example, an Osaka branch office, a Nagoya branch office, and a Fukuoka branch office. The four LANs 91, 92, 93, 94 are respectively connected to the Internet, which is a global network.

Figure 2:
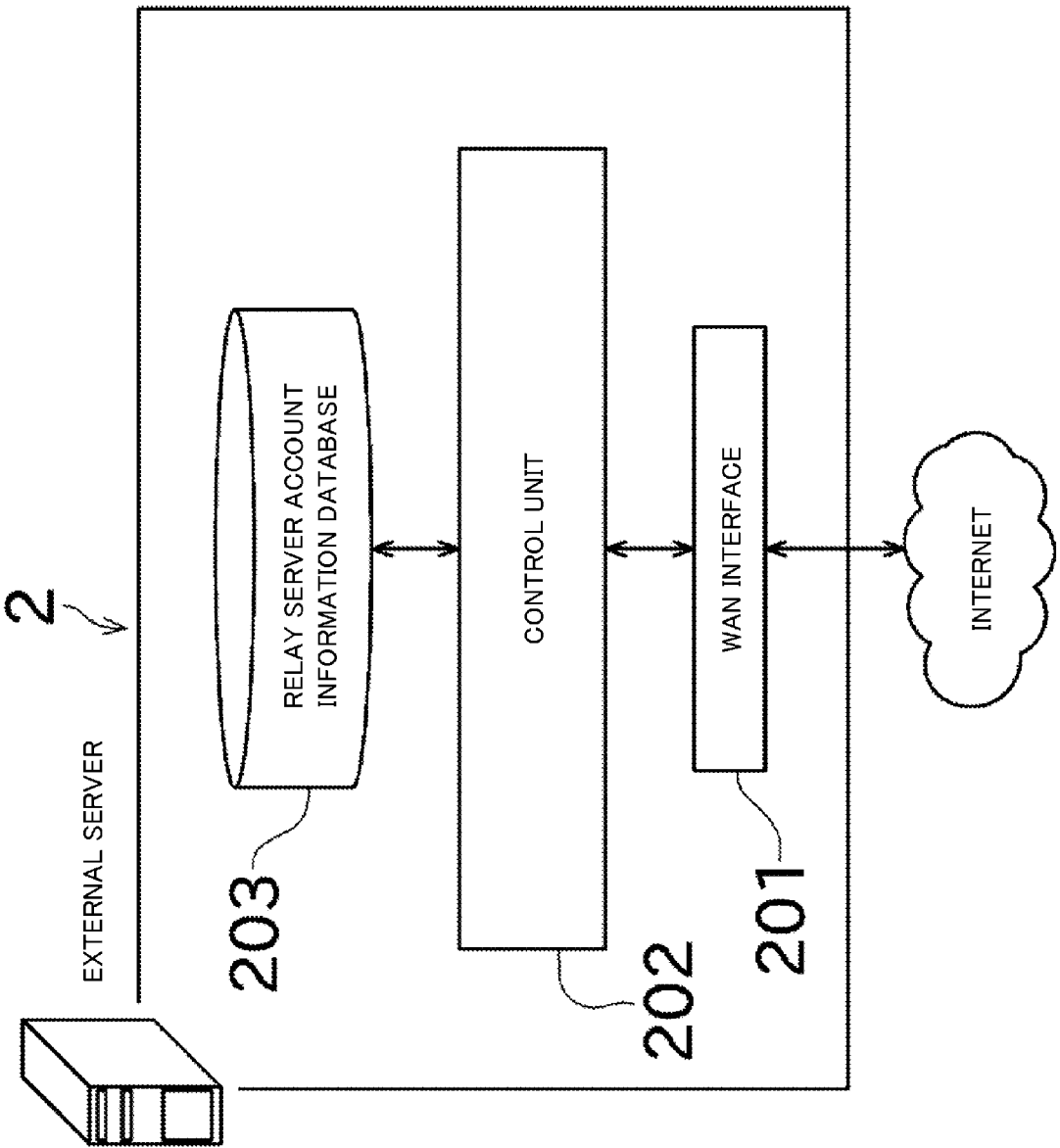
FIG. 2 is a functional block diagram of an external server according to a preferred embodiment of the present invention.

The external server 2 will now be described with reference to FIG. 2, etc. FIG. 2 is a functional block diagram of the external server 2. The external server 2 is a device connected to the Internet that facilitates the communication performed between the relay servers 1 arranged in the respective LANs.

The external server 2 illustrated in FIG. 2 functions as a Session Initiation Protocol (SIP) server. Specifically, the external server 2 functions as both an SIP proxy server arranged to relay SIP methods and responses, etc., and an SIP registrar server arranged to register an account of the relay server 1.

As illustrated in FIG. 2, the external server 2 preferably includes a WAN interface 201, a control unit 202, and a relay server account information database 203 as a primary configuration.

The WAN interface 201 is an interface arranged to communicate with each device, such as, for example, the relay server 1 connected to the Internet, by using a global IP address.

The relay server account information database 203 is a database that manages, in association with the global IP address, an account of the relay server 1 that has made a registration request.

The control unit 202 is a processing unit that controls various communications performed through the WAN interface 201, and controls communication processes complying with protocols such as, for example, Transmission Control Protocol/Internet Protocol (TCP/IP), User Datagram Protocol (UDP) and SIP. The control unit 202 performs, for example, a process of receiving the account of the relay server 1 from each relay server 1 and a process of registering the received account in the relay server account information database 203. Moreover, the control unit 202 performs, for example, a process of relaying communication data, such as various SIP methods and responses transmitted from the relay server 1, to other relay servers 1.

The client terminal 5 will now be described with reference to FIG. 3, which is a functional block diagram of the client terminal 5.

The client terminal 5 is a terminal that can be directly operated by a user, and includes a Personal Computer (PC) or other similar devices used by the user, for example, on a daily basis. Accordingly, a great number of client terminals 5 typically exist in the LAN. In the present preferred embodiment, as illustrated in FIG. 1, client terminals 11, 12 are connected to the LAN 91, client terminals 21, 22 are connected to the LAN 92, client terminals 31, 32 are connected to the LAN 93, and client terminals 41, 42 are connected to the LAN 94. Each client terminal 5 is preferably provided with a private IP address uniquely managed in the same LAN.

Figure 3:
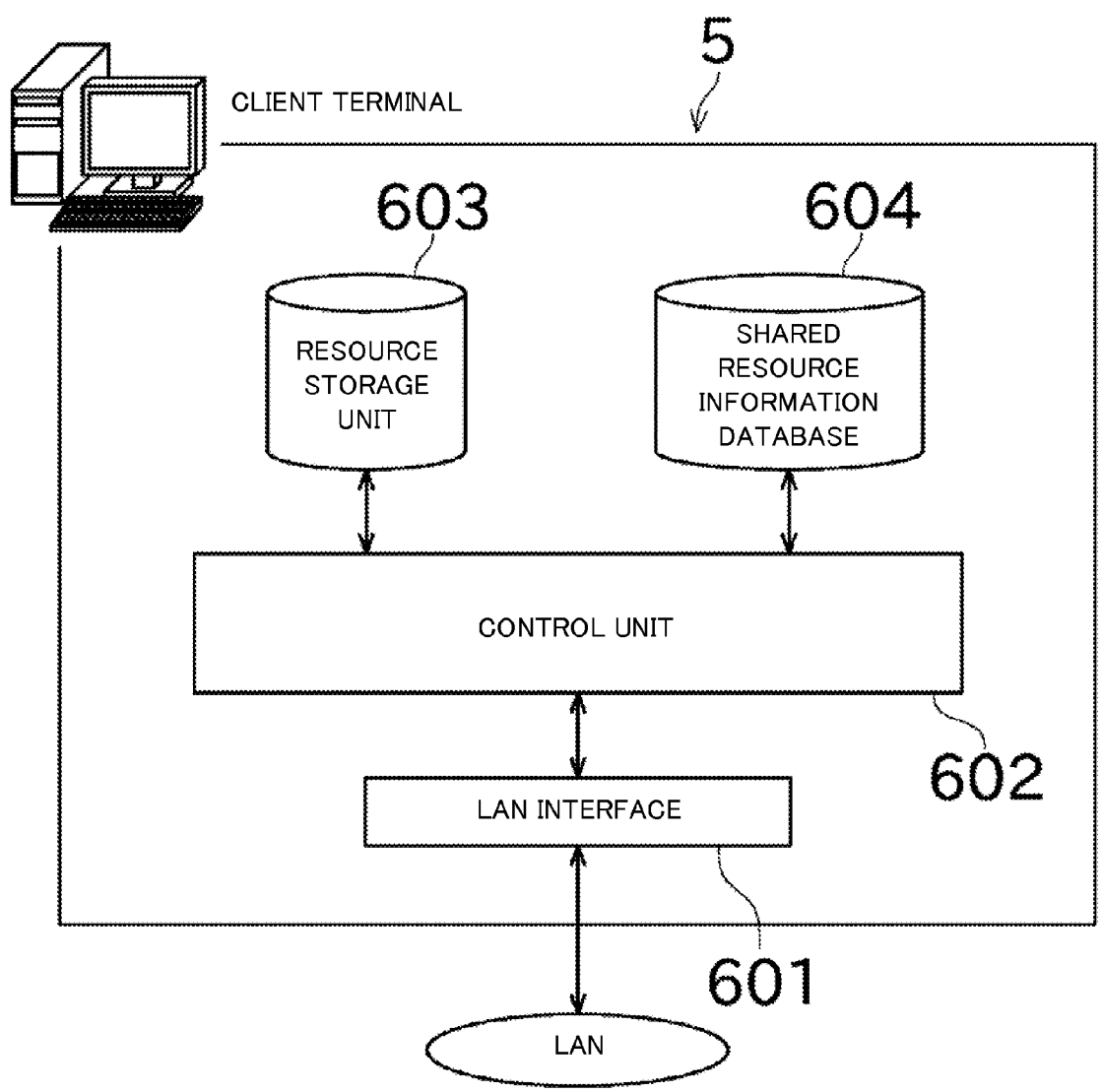
FIG. 3 is a functional block diagram of a client terminal according to a preferred embodiment of the present invention.

As illustrated in FIG. 3, the client terminal 5 preferably includes a LAN interface 601, a control unit 602, a resource storage unit 603, and a shared resource information database 604 as a primary configuration.

The LAN interface 601 is an interface arranged to communicate with each device, such as the relay server 1 and the file server 6 connected to the same LAN, by using the private IP address.

The resource storage unit 603 stores resources, such as, for example, files, folders, etc., that can be handled by the client terminal 5.

The shared resource information database 604 stores shared resource information held by each client terminal 5.

The control unit 602 is a processing unit that controls various communications performed through the LAN interface 601. The control unit 602 controls communication processes complying with protocols such as, for example, TCP/IP, UDP, and SIP.

The control unit 602 performs, for example, a process of controlling a handling such as, for example, movement (transfer), change, deletion, etc., of the resources stored in the resource storage unit 603. The control unit 602 also performs a process of updating the shared resource information stored in the shared resource information database 604 when a change notification of the shared resource information is received from the relay server 1.

The relay server 1 will now be described with reference to FIG. 4, which is a functional block diagram of each relay server 1.

As illustrated in FIG. 1, one relay server 1 is arranged in each LAN. Specifically, a relay server R1 is arranged in the LAN 91, a relay server R2 is arranged in the LAN 92, a relay server R3 is arranged in the LAN 93, and a relay server R4 is arranged in the LAN 94.

The relay server 1 is connected to the LAN, and can communicate with each client terminal 5 that is connected to the same LAN. The relay server 1 is also connected to the Internet, and can communicate with the relay servers 1 that are connected to the other LANs (through the external server 2). In order to permit such communication, each relay server 1 is provided with both a private IP address and a global IP address.

Figure 4:
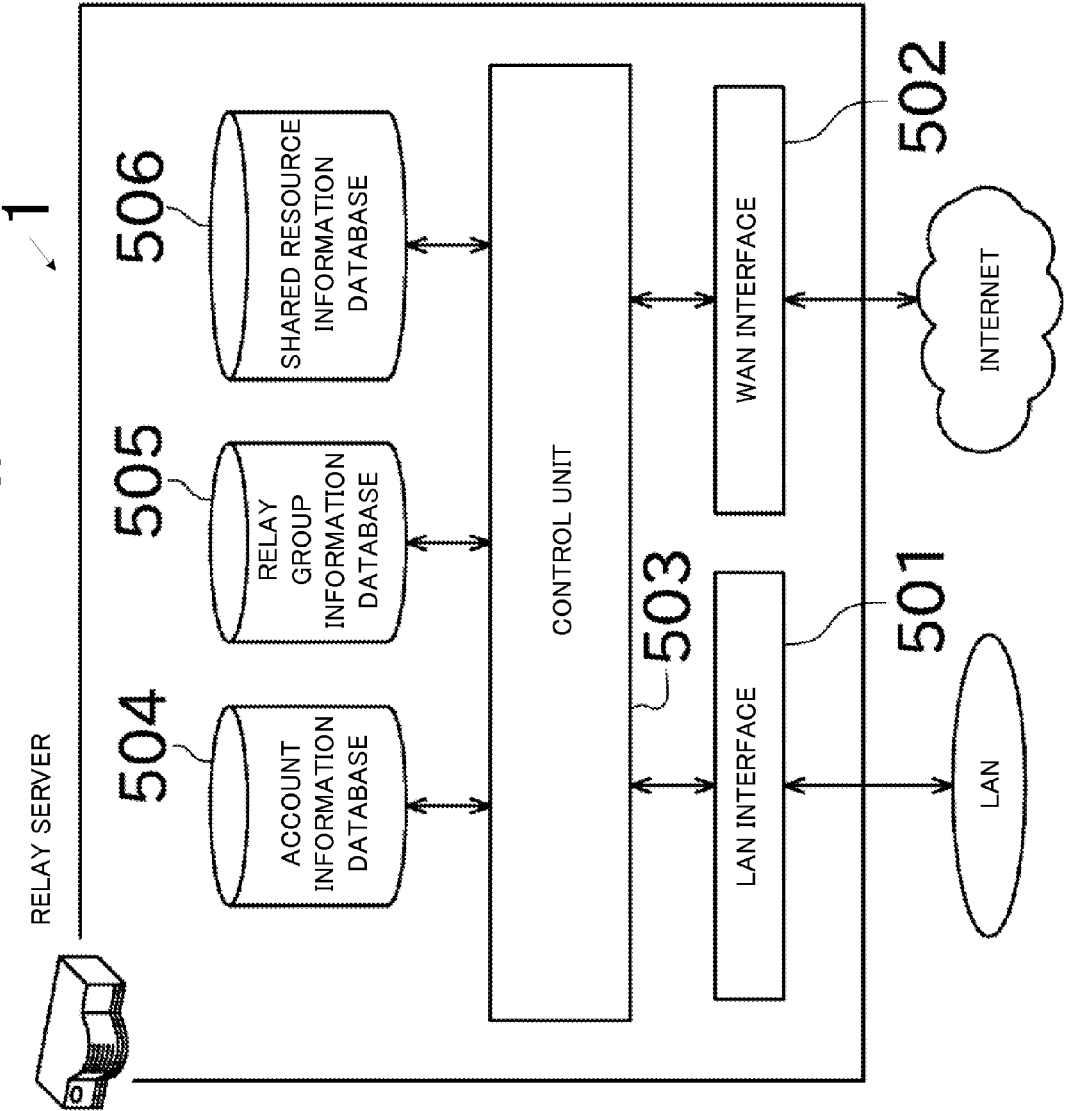
FIG. 4 is a functional block diagram of a relay server according to a preferred embodiment of the present invention.

As illustrated in FIG. 4, the relay server 1 preferably includes a LAN interface 501, a WAN interface 502, a control unit 503, an account information database 504, a relay group information database 505, and a shared resource information database 506 as a primary configuration.

The LAN interface 501 is an interface arranged to communicate with the client terminal 5 connected to the same LAN (i.e., the LAN to which the relay server 1 is connected), by using the private IP address. For example, the relay server R1 can communicate with each of the client terminals 11, 12 in the LAN 91 by using the LAN interface 501.

The WAN interface 502 is an interface arranged to communicate with each apparatus such as the external server 2 connected to the Internet, by using the global IP address.

Each relay server 1 preferably functions as an SIP registrar server, and communicates with each client terminal 5 by using a SIP. For example, in the LAN 92, the relay server R2 functions as an SIP registrar server, receives an account of each client terminal 21, 22 connected to the LAN 92, and registers the received accounts in the account information database 504.

Figure 5:
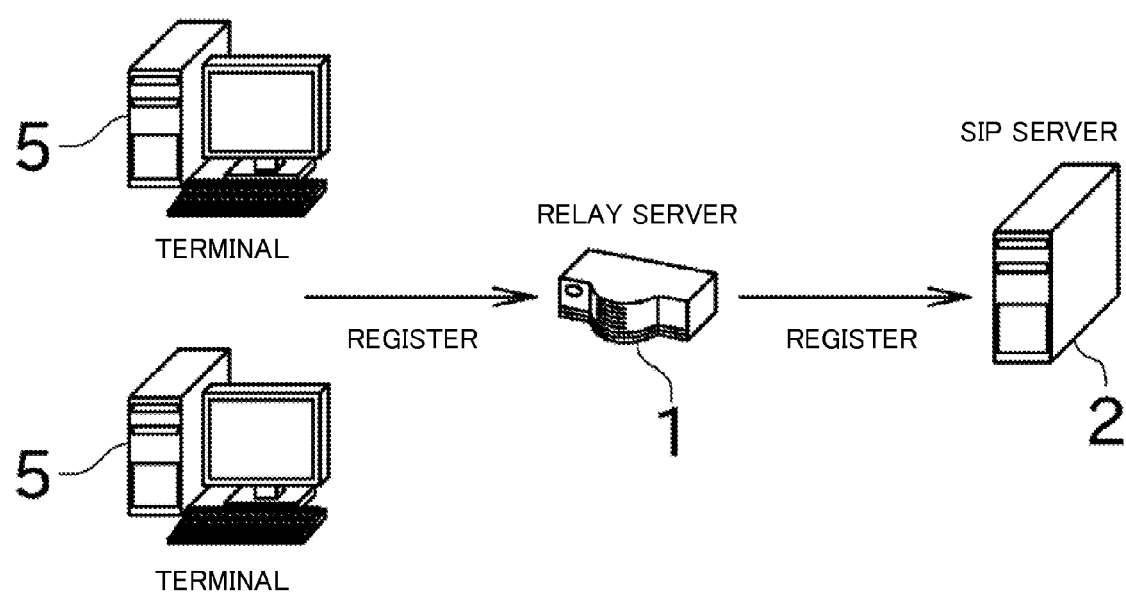
FIG. 5 illustrates the relationship among the client terminal, the relay server, and the external server according to a preferred embodiment of the present invention.

Accordingly, as illustrated in FIG. 5, in the relationship with the client terminal 5, the relay server 1 functions as a server that receives the account from the client terminal 5 and registers (REGISTER) the account. In the relationship with the external server 2, the relay server 1 functions as a client that transmits the account to the external server 2 and registers (REGISTER) the account.

The account information database 504 of FIG. 4 is a database that manages, in association with the private IP address, the account of the client terminal 5 that has made a registration request.

The relay group information database 505 is preferably a database that manages relay group information related to the client terminal 5 registered in the account information database 504.

The shared resource information database 506 is preferably a database that manages the shared resource information related to the client terminal 5 registered in the account information database 504.

The control unit 503 is preferably a processing unit that controls various communications performed through the LAN interface 501 and the WAN interface 502, and controls various communication processes complying with protocols such as, for example, TCP/IP, UDP, SIP, etc.

For example, the control unit 503 performs a process of transmitting an account thereof to the external server 2 and requesting registration of the account, and a process of creating the relay group information to store in the relay group information database 505. The control unit 503 also performs a process of creating the shared resource information to store in the shared resource information database 506.

The file server 6 will now be described. As illustrated in FIG. 1, the file server 6 is connected to the LAN, and can communicate with each client terminal 5 connected to the same LAN.

The file server 6 can store resources such as, for example, files, folders, etc., and functions as a resource storage unit alternative to the resource storage unit 603 (shown in FIG. 3) of each client terminal 5. In other words, in the present preferred embodiment, the resource that can be handled by each client terminal 5 may be stored in a local disc of the client terminal 5, and/or may be stored in the file server 6 provided as a network drive. The file server 6 is not necessarily required in each LAN, and the installation thereof is omitted in the LANs 92 and 94 in FIG. 1.

The relay group information and the shared resource information, which is information handled in the relay communication system of the present preferred embodiment, will now be described.

First, the relay group information will be described with reference to FIG. 6, which illustrates an example of content of the relay group information.

Figure 6:
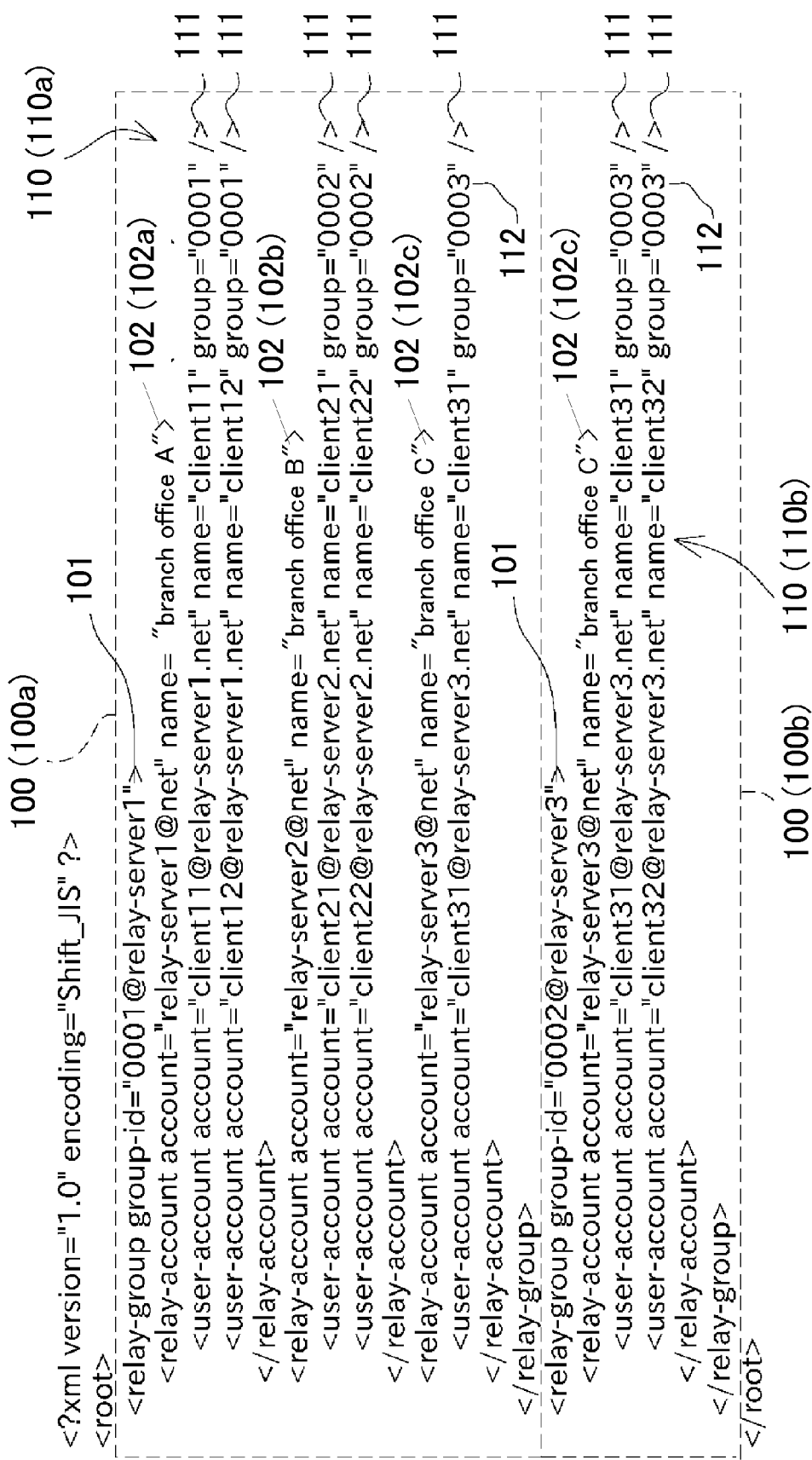
FIG. 6 illustrates a content of relay group information according to a preferred embodiment of the present invention.

FIG. 6 illustrates an example of the storage content of the relay group information database 505 of the relay server R3. In this example, relay group information 100a and 100b is stored in the relay group information database 505.

Each of the relay group information 100a and 100b includes group identification information 101, information 102 about the relay server 1 that defines a relay group by enabling connection with one another, and resource sharable terminal information 110.

The group identification information 101 is used to identify the corresponding relay group information 100, and is given a different identification ID each time the relay group information 100 is created, so as to be uniquely identified. Thus, an operator (or the user) can specify the relay group based on the group identification information 101 and easily change a group configuration.

The relay account information 102 (102a, 102b, 102c) includes information about the account of each relay server 1 that defines a relay group by enabling the connection with one another. For example, in the relay group information 100a illustrated on an upper side of FIG. 6, the accounts of the relay servers R1, R2, and R3 that form a relay group are described. In the relay group information 100b illustrated on a lower side of FIG. 6, the account of the relay server R3 that forms another relay group is described.

A specific name that is given to the account of each relay server 1 is also registered in the relay account information 102 so as to allow the user to identify easily. For example, in the relay account information 102a of the relay server R1 (relay-server 1), a name (branch office A) is given to the account (relay-server1@net) of the relay server R1.

As described above, the relay group information 100a and 100b are created such that they can be uniquely identified with respect to each relay group. The relay group information 100a and 100b include the account (relay account information 102) of each relay server that defines a group (relay group) by enabling the connection with one another. Accordingly, by referring to the relay group information 100a and 100b, the operator or the user can recognize which LANs form a group.

The resource sharable terminal information 110 that can be included in the relay group information 100 will be described.

As illustrated in FIG. 6, the resource sharable terminal information 110 is registered in association with each piece of relay group information 100. For example, resource sharable terminal information 110a is registered in association with the relay group information 100a, and resource sharable terminal information 110b is registered in association with the relay group information 100b.

Each of the resource sharable terminal information 110a and 110b includes individual terminal information 111 that describes the client terminal 5 that can share the resource in the respective relay groups in the relay group information 100a and 100b. The individual terminal information 111 describes the account of each client terminal 5 that can share the resource.

For example, the relay group information 100a corresponding to the resource sharable terminal information 110a illustrated on the upper side of FIG. 6 defines the relay group that is defined by the relay servers R1, R2, and R3. As illustrated in FIG. 1, the client terminals 11 and 12 are arranged in the LAN 91 to which the relay server R1 is connected. In the example of the resource sharable terminal information 110a illustrated on the upper side of FIG. 6, the two client terminals 11 and 12 are selected as the terminals that can share the resource in the relay group, and account information thereof is registered as the individual terminal information 111. Similarly, the client terminals 21 and 22 are selected as the resource sharable terminals in the LAN 92 to which the relay server R2 is connected. Although the client terminals 31 and 32 are arranged in the LAN 93 to which the relay server R3 is connected, in the example of the resource sharable terminal information 110a, only the client terminal 31 is selected as the resource sharable terminal, and account information thereof is registered as the individual terminal information 111.

The relay group information 100b corresponding to the resource sharable terminal information 110b illustrated on the lower side of FIG. 6 defines the relay group formed by only the relay server R3. In the example of the resource sharable terminal information 110b, the two client terminals 31 and 32 are selected as the resource sharable terminals in the LAN 93 to which the relay server R3 is connected, and account information thereof is registered as the individual terminal information 111.

In addition to the account of each resource sharable terminal, a specific name given to the account is registered in the individual terminal information 111 so as to be easily identified by the user. For example, in the case of client terminal 11, a name (client 11) given to the account thereof (for example, client11@relay-server1.net) is described. Moreover, department identification data 112 indicating a department of the resource sharable terminal, such as, for example, a sales division and a development division, is described in the individual terminal information 111.

In the resource sharable terminal information 110, each individual terminal information 111 is described in association with the relay account information 102 of the relay server connected to the LAN to which the resource sharable terminals are connected. For example, the individual terminal information 111 related to the client terminal 11 is described in association with the relay account information 102a of the relay server R1.

As illustrated in FIG. 6, the relay group information database 505 can store a plurality of relay group information 100 and a plurality of resource sharable terminal information 110. In both the resource sharable terminal information 110a and 110b of the two relay groups, the client terminal 31 is the resource sharable terminal, and the individual terminal information 111 thereof is described. Accordingly, one client terminal 5 can be selected as the resource sharable terminal in a plurality of relay groups, and the resource sharable terminal information 110 indicating that the one client terminal may be the resource sharable terminal in the plurality of relay groups can be stored in the relay group information database 505.

Each of the relay group information 100 is exchanged between each relay server 1 that defines the relay group. For example, the relay group information 100a illustrated on the upper side of FIG. 6 is exchanged among the three relay servers R1, R2, and R3, and is stored in the relay group information database 505 of each relay server R1, R2, and R3. The relay group information 100b illustrated on the lower side of FIG. 6 is held only by the relay server R3, and is stored in the relay group information database 505 of the relay server R3.

The content of the shared resource information will now be described with reference to FIGS. 7 through 9. FIG. 7 illustrates an example of shared resource information 120 stored in the shared resource information database 604 of the client terminal 11. The shared resource information 120 is also stored in the shared resource information database 506 of the relay server R1 connected to the same LAN to which the client terminal 11 is connected.

The shared resource information 120 includes account identification information 121 indicating that the information 120 is the shared resource information related to the client terminal 11 and individual shared resource information 122 related to the client terminal 11.

Since the shared resource information 120 is created with respect to each client terminal 5, the account identification information 121 is used to identify the created shared resource information 120.

The individual shared resource information 122 includes shared resource identification information 123, family account information 124, family resource information 125 (125a, 125b), and message information 127, etc.

The shared resource identification information 123 is used to identify the individual shared resource information 122 thereof, and can be uniquely identified by being given a different ID each time the individual shared resource information 122 is created. The shared resource identification information 123 includes (1) an ID that is associated with the client terminal 5 that has made a request to create the shared resource information 120 and (2) a name that is used to easily identify the ID. For example, the ID may be "20071001150032client11@relay-server1" or the like, and the name for facilitating the identification may be "workspace1", or the like.

Thus, the user etc. can specify the individual shared resource information 122 based on the shared resource identification information 123, and thus can easily edit the content of the individual shared resource information 122.

FIG. 8 illustrates the detailed content of the family resource information 125 of FIG. 7. As illustrated in FIG. 8, the family resource information 125 (125a, 125b) includes collections of resource information 126 indicating resources such as files and folders held by the client terminal 5.

Each resource information 126 includes (1) name information of a shared resource, (2) account information of the client terminal 5 (owner client terminal) that can handle the resource, (3) address information indicating the whereabouts of the resource, and (4) status information of the resource.

A name of the shared resource is given to the resource when the resource is shared by a plurality of client terminals 5, and may be described as follows, for example: name="folderA". In the account information of the owner client terminal, an account for identifying the owner client terminal is described as follows, for example: owner="client11@relay-server1.net". An address indicating the whereabouts of the resource indicates the location in which the shared resource is actually stored in the resource storage unit 603 (or the file server 6), and may be described by using a full path as follows, for example: value="c:/folderA". The status information indicates the status of the resource, and is described as follows, for example: status="OK".

The family account information 124 of FIG. 7 includes collections of information of accounts (for example, client11@relay-server1.net) of the client terminals 5 that share the resource indicated in the family resource information 125.

In the example of family resource information 125a of FIG. 8, the owner client terminal is the client terminal 11. The client terminals (user client terminals) that can handle the resource indirectly via the owner client terminal 11 are the client terminals other than the owner client terminal 11 that are described in the family account information 124. In other words, in this example, the client terminals 21 and 31 are the user client terminals.

As illustrated in FIG. 8, a plurality of family resource information 125 can be described, and the owner client terminal described in each of the plurality of family resource information 125 may be different from one another. Accordingly, the relationship between the owner client terminal and the user client terminals is not fixed, and any client terminal described in the family account information 124 may be the owner client terminal. In the following description, the client terminal described in the family account information 124 may be referred to as a sharing member terminal.

Each of the client terminals 11, 21, and 31, which are the sharing member terminals in the example of FIG. 7, is connected to the LAN to which any of the relay servers R1, R2, and R3, which form the relay group described in the relay group information 100a of FIG. 6, is connected. In the resource sharable terminal information 110a of the relay group, each sharing member terminal corresponds to the client terminal that has the individual terminal information 111 thereof described as the resource sharable terminal.

Each sharing member terminal stores, in the shared resource information database 604, the shared resource information 120 including the individual shared resource information 122 having the above-described content.

A message that is exchanged among the sharing member terminals can be registered in the message information 127 illustrated in FIG. 7. In the present preferred embodiment, in addition to the messages exchanged among the client terminals 5, a notifying message, which is automatically generated by the relay server 1, can be registered in the message information 127. The message information 127 includes message identification information 130, transmission date and time information 131, related terminal information 132, and message content information 133.

The message identification information 130 is used to identify each message. The transmission date and time information 131 indicates date and time at which the message is transmitted (i.e., the date and time at which the message information 127 is added to the shared resource information 120).

The related terminal information 132 is the account information of the client terminal that involves in the creation of the message. Normally, the account of the client terminal 5 that has transmitted the message is described in the related terminal information 132. However, when the client terminal 5 handles the shared resource, and the relay server 1 automatically generates a message in response, the account of the client terminal 5 that has handled the resource is described.

The message content information 133 includes information related to encoding of the message and information related to a content of a message body text. A detailed content of the message content information 133 is illustrated in FIG. 9. In the present preferred embodiment, a Multipurpose Internet Mail Extension (MIME) header is described as the information related to the encoding of the message. Further, character strings derived from a Japanese text message on which MIME encoding is performed are described as the content of the message body text.

Figure 10:
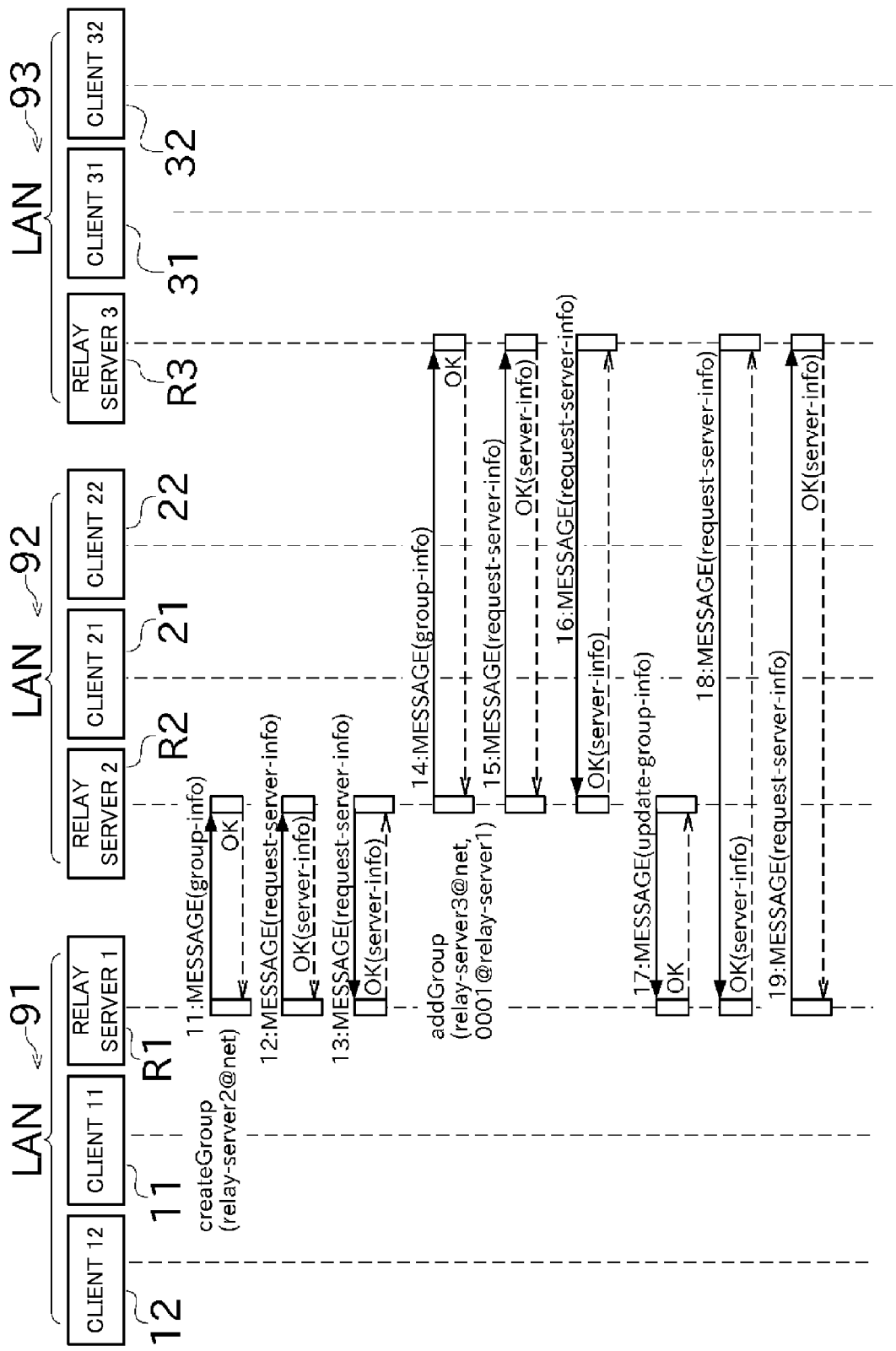
FIG. 10 is a sequence chart illustrating a communication process of creating a relay group according to a preferred embodiment of the present invention.

Next, with reference to sequence numbers 11 through 19 of FIG. 10, generation steps and registration steps of the relay group will be described. Generally, processes of sequence numbers 11 through 19 of FIG. 10 are performed as initial settings of the network by the user and operator.

First, in the relay server R1, a method (createGroup method) that newly defines a relay group with the relay server R2 is executed by the operator. In the createGroup method, an account (relay-server2@net) of the relay server R2 with which the relay group is formed is specified.

Accordingly, the relay group information 100a is newly created in the relay server R1. At this time, an identification ID (0001@relay-server1) is given to the corresponding relay group information and described in the group identification information 101.

Then, a message transmission command (MESSAGE method) is executed in the relay server R1, and a "group-info message" with respect to the relay server R2 is transmitted to the external server 2 (sequence number 11). The message includes the identification ID of the relay group information created in the "createGroup method", or the like.

An account (sip:relay-server2@net) of the relay server R2, which is a message transmission destination, is specified in the MESSAGE method. By referring to the relay server account information database 203, the external server 2 acquires the global IP address of the relay server R2, and relays the "group-info message" from the relay server R1 to the relay server R2. Having received the message, the relay server R2 returns an "OK" response to the relay server R1 via the external server 2.

As described above, communication between each relay server 1 in the present preferred embodiment is performed via the external server 2, and the same is applied to the following description. Accordingly, in the following description, specific descriptions of the communication process performed via the external server 2 will be omitted.

Next, the relay server R1 transmits a message requesting transmission of server information (request-server-info message) to the relay server R2 (sequence number 12). Having received the message, the relay server R2 returns an "OK" response and information (server-info) related thereto to the relay server R1.

Conversely, the relay server R2 transmits a "request-server-info message" to the relay server R1 (sequence number 13), and the relay server R1 returns information (server-info) related thereto to the relay server R2.

Thus, by exchanging each of the server information, both the information related to the relay server R1 and the information related to the relay server R2 are described in the relay account information 102 of the relay group information 100, and are stored in the relay group information database 505 of each relay server R1 and R2.

Next, a method (addGroup method) in which the relay server R3 is newly added to the previously created relay group (i.e., the relay group formed by the relay servers R1 and R2) is performed in the relay server R2 by the operator. An account (relay-server3@net) of the relay server R3 to be added and the identification ID (0001@relay-server1) of the relay group to which the relay server R3 will be added are specified in the "addGroup method".

Then, the relay server R2 transmits a "group-info message" to the relay server R3 to be added (sequence number 14). The message includes the identification ID of the relay group specified in the "addGroup method", or the like. Having received the message, the relay server R3 returns an "OK" response to the relay server R2. Then, similarly to the descriptions of sequence numbers 12, 13, server information is exchanged between the relay servers R2 and R3 (sequence numbers 15, 16).

The relay server R2 transmits, to the relay server R1, an "update-group-info message" notifying that the relay server R3 has been added to the relay group (sequence number 17). Having received the message, the relay server R1 returns an "OK" response to the relay server R2. Then, the server information is exchanged between the relay servers R3 and R1 (sequence numbers 18, 19).

Thus, the relay group information 100 (i.e., information having the content of the relay group information 100a of FIG. 6) indicating that the relay servers R1, R2, and R3 define the relay group is stored in the relay group information database 505 of each relay server R1, R2, and R3.

Although not illustrated in FIG. 10, the "createGroup method" is further executed in the relay server R3 without specifying the other relay servers that define the relay group. As a result, the relay group information 100b defined only by the relay server R3 is created, and an identification ID (0002@relay-server2) is given and stored in the relay group information database 505 of the relay server R3.

Next, with reference to sequence numbers 21 through 29 of FIG. 11, registration steps of the resource sharable terminals with respect to the relay group will be described.

In the relay server R1, a method (addTerminal method) in which the client terminal 11 is registered as the resource sharable terminal in the relay group formed by the relay servers R1, R2, and R3 is executed by the operator. Both the account of the client terminal 11 and the identification ID (0001@relay-server1) indicating the registration destination relay group are specified in the "addTerminal method".

When the "addTerminal method" is executed, the relay server R1 searches the relay group information database 505 thereof. Then, the relay server R1 adds the individual terminal information 111 of the client terminal 11 to the resource sharable terminal information 110 that corresponds to the relay group information of the specified identification ID.

Then, the relay server R1 immediately specifies the relay group information 100 from the storage content of the relay group information database 505 by using the identification ID, and searches for the relay servers 1 that define the relay group. As a result, it is determined from the relay group information 100a of FIG. 6 that the relay group is defined by the relay servers R1, R2, and R3.

Accordingly, the relay server R1 transmits, to the relay server R2, an "add-group-info message" requesting an addition of the resource sharable terminal to the relay group (sequence number 21). The message includes the account of the client terminal 11 to be added and the identification ID of the registration destination relay group, or the like. Having received the message, the relay server R2 adds the individual terminal information 111 of the client terminal 11 to the resource sharable terminal information 110 stored in the relay group information database 505, and then returns an "OK" response.

Then, the relay server R1 transmits a "group-info message" to the client terminal 11 (sequence number 22). The message includes the resource sharable terminal information 110 to which the individual terminal information 111 of the client 11 is added. Having received the message, the client terminal 11 then stores the content of the received resource sharable terminal information 110 in a suitable storage unit.

Subsequently, the relay server R1 also transmits, to the relay server R3, the "add-group-info message" requesting the addition of the resource sharable terminal to the relay group (sequence number 23). Having received the message, the relay server R3 adds the individual terminal information 111 of the client terminal 11 to the resource sharable terminal information 110 stored in the relay group information database 505, and then returns an "OK" response.

Thus, the individual terminal information 111 of the client terminal 11 is registered as the resource sharable terminal in the resource sharable terminal information 110 of the relay group information 100 stored in the relay group information database 505 of each relay server R1, R2, and R3.

Next, in the relay server R2, a method (addTerminal method) in which the identification ID of the relay group is specified, and the client terminal 21 is registered as the resource sharable terminal is executed by the operator.

The relay server R2 searches the relay group information database 505 thereof, and adds the individual terminal information 111 of the client terminal 21 to the resource sharable terminal information 110 that corresponds to the relay group information specified by using the identification ID.

Then, the relay server R2 transmits, to the relay server R1, an "add-group-info message" requesting an addition of the resource sharable terminal to the relay group (sequence number 24). The message includes an account of the client terminal 21 to be added and the identification ID of the registration destination relay group, or the like.

Having received the message, the relay server R1 adds the individual terminal information 111 of the client terminal 21 to the resource sharable terminal information 110 stored in the relay group information database 505. Further, the relay server R1 transmits an "add-group-info message" to the client terminal 11, which is connected to the same LAN and is stored as the resource sharable terminal (sequence number 24.1). Having received the message, the client terminal 11 stores the individual terminal information 111 of the client terminal 21 in a suitable storage unit. Then, the client terminal 11 returns an "OK" response to the relay server R1. Having received the response, the relay server R1 returns an "OK" response to the relay server R2.

Furthermore, the relay server R2 transmits a "group-info message" to the client terminal 21 (sequence number 25). The message includes the resource sharable terminal information 110 to which the individual terminal information 111 of each client terminal 11 and 21 is added. Having received the message, the client terminal 21 stores the content of the received resource sharable terminal information 110 in a suitable storage unit.

Subsequently, the relay server R2 also transmits, to the relay server R3, the "add-group-info message" requesting an addition of the resource sharable terminal to the relay group (sequence number 26). Having received the message, the relay server R3 adds the individual terminal information 111 of the client terminal 21 to the resource sharable terminal information 110 stored in the relay group information database 505, and then returns an "OK" response.

Thus, the individual terminal information 111 of each client terminal 11 and 21 has been registered as the resource sharable terminal in the resource sharable terminal information 110 of the relay group information 100 stored in the relay group information database 505 of each relay server R1, R2, and R3.

Next, in the relay server R3, a method (addTerminal method) in which the identification ID of the relay group is specified, and the client terminal 31 is registered as the resource sharable terminal is executed by the operator.

The relay server R3 searches the relay group information database 505 thereof, and adds the individual terminal information 111 of the client terminal 31 to the resource sharable terminal information 110 related to the relay group specified by using the identification ID.

Further, the relay server R3 transmits, to the relay server R1, an "add-group-info message" requesting an addition of the resource sharable terminal to the relay group (sequence number 27). The message includes an account of the client terminal 31 to be added and the identification ID of the registration destination relay group, or the like.

Having received the message, the relay server R1 adds the individual terminal information 111 of the client terminal 31 to the resource sharable terminal information 110 stored in the relay group information database 505. Further, the relay server R1 transmits an "add-group-info message" to the client terminal 11, which is connected to the same LAN and has already been stored as the resource sharable terminal (sequence number 27.1). Having received the message, the client terminal 11 stores the individual terminal information 111 of the client terminal 31 in a suitable storage unit. Then, the client terminal 11 returns an "OK" response to the relay server R1. Having received the response, the relay server R1 returns an "OK" response to the relay server R3.

Then, the relay server R3 transmits a "group-info message" to the client terminal 31 (sequence number 28). The message includes the resource sharable terminal information 110 to which the individual terminal information 111 of the client terminal 31 is added. Having received the message, the client terminal 31 stores the content of the received resource sharable terminal information 110 in a suitable storage unit.

Then, the relay server R3 also transmits, to the relay server R2, the "add-group-info message" requesting the addition of the resource sharable terminal to the relay group (sequence number 29). Having received the message, the relay server R2 adds the individual terminal information 111 of the client terminal 31 to the resource sharable terminal information 110 stored in the relay group information database 505. Further, the relay server R2 transmits the "add-group-info message" to the client terminal 21, which is connected to the same LAN and has already been stored as the resource sharable terminal (sequence number 29.1). Having received the message, the client terminal 21 stores the individual terminal information 111 of the client terminal 31 in a suitable storage unit. Then, the client terminal 21 returns an "OK" response to the relay server R2. Having received the response, the relay server R2 returns an "OK" response to the relay server R3.

Thus, the individual terminal information 111 of each client terminal 11, 21, and 31 is registered as the resource sharable terminal in the resource sharable terminal information 110 of the relay group information 100 stored in the relay group information database 505 of each relay server R1, R2, and R3.

Figure 11:
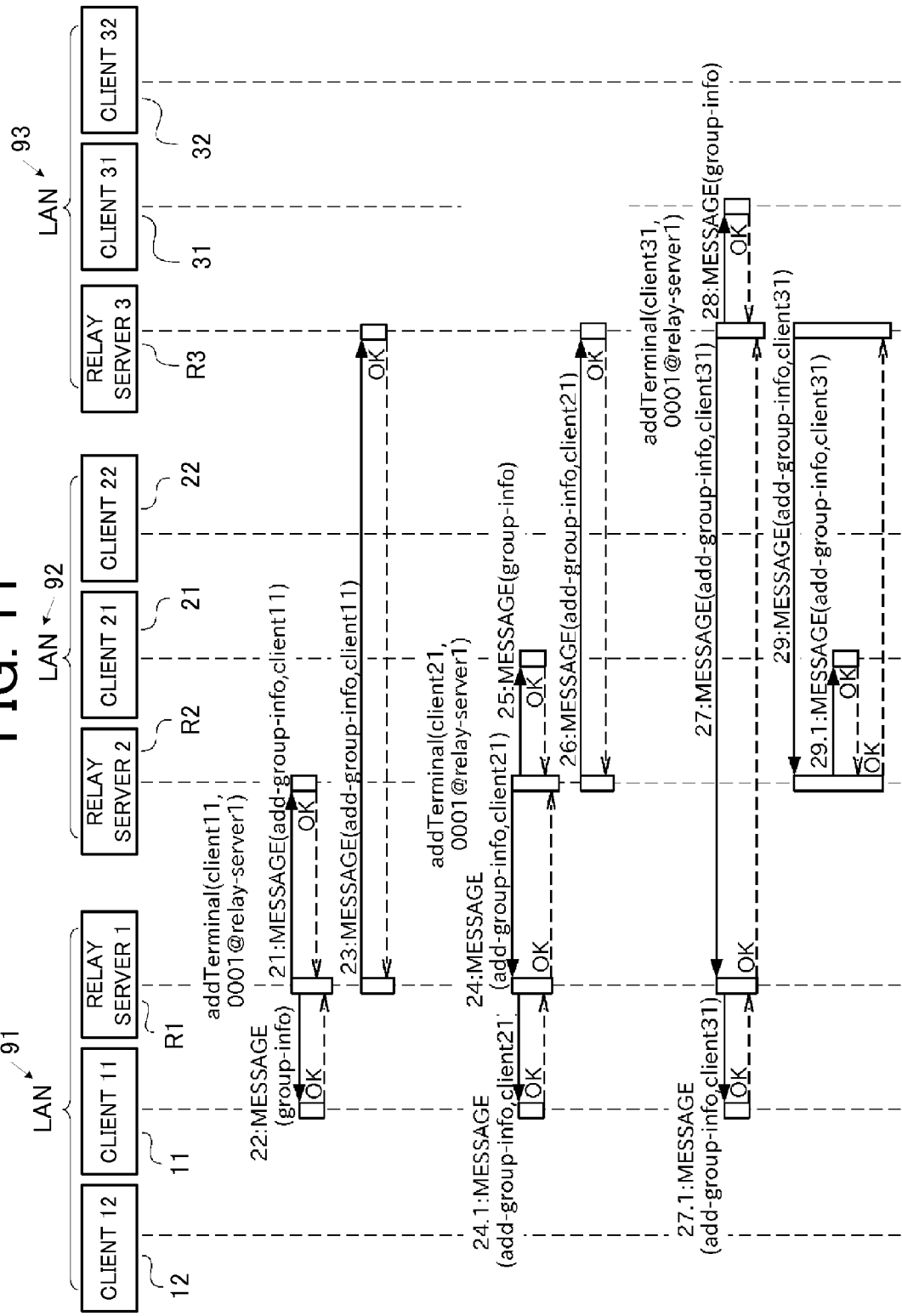
FIG. 11 is a sequence chart illustrating a communication process of registering the client terminal in the relay group as a resource sharable terminal according to a preferred embodiment of the present invention.

Although not illustrated in FIG. 11, an operation for adding the client terminals 12 and 22 to the relay group information (having the identification ID "0001@relay-server1") is further performed. As a result, the individual terminal information 111 of each client terminal 11, 12, 21, 22, and 31 is registered as the resource sharable terminal in the resource sharable terminal information 110 of the relay group information 100 (refer to reference numeral 110a of FIG. 6). Furthermore, in the relay server R3, an operation for adding the client terminals 31 and 32 to another relay group information (having the identification ID "0002@relay-server2") is subsequently performed.

The process of registering the client terminals as the resource sharable terminals has been described in FIG. 11. The relay server 1 can also perform a process ("deleteTerminal method") of unregistering the client terminal 5 as the resource sharable terminal. In such a case, the individual terminal information 111 of the specified client terminal 5 is deleted from the resource sharable terminal information 110.

Next, with reference to FIG. 12, an operation for sharing a resource of the client terminal 5 will be described. Here, an example will be described in which the client terminal 11 creates a resource to be shared, and in which a file "order.doc" held by the client terminal 11 is shared with the client terminals 21 and 31 in the relay group having the identification ID "0001@relay-server1".

The user specifies the relay group having the identification ID "0001@relay-server1" by operating the client terminal 11, and then gives an instruction to the client terminal 11 to display the resource sharable terminals of the relay group. The client terminal 11 acquires the information related to the resource sharable terminals by communicating with the relay server R1, and displays, on a screen, a list of resource sharable terminals of the specified relay group.

Since the relay group having the identification ID "0001@relay-server1" is specified, the client terminals 12, 21, 22, and 31 are displayed as the resource sharable terminals based on the resource sharable terminal information 110a illustrated on the upper side of FIG. 6. The user specifies the displayed client terminals 21 and 31 as the terminals (user client terminals) that will share the resource.

At this time, the client terminal 11 inquires whether or not to automatically issue a message indicating that the shared resource has been updated. In response to the inquiry, in the present example, the user instructs to automatically issue the message.

Accordingly, the client terminal 11 transmits a request (createSharedResource command) for creating the shared resource to the relay server R1 (sequence number 31 of FIG. 11). The message includes the identification ID of the relay group and the information related to the specified user client terminals 21 and 31.

Having received the message, the relay server R1 creates the shared resource information 120 to store in the shared resource information database 506 thereof. Further, the relay server R1 automatically creates message information 127a related to a text message indicating that the shared resource has been created, and then executes a message adding command (AddMessage method). In the present example, the message identification information 133 (FIG. 7) of the message information 127a includes a unique identification number, the transmission date and time 131 includes a creation date and time of the text message, and the related terminal information 132 includes the account of the client terminal 11, which has requested the creation of the shared resource. The message content information 133a (the content of the text message) illustrated in FIG. 9 is automatically generated based on a predetermined model, and will be described later in detail.

The AddMessage method is executed number of times that is based on the number of user client terminals (i.e., in the present example, the AddMessage method is executed twice, one time with respect to the user client terminal 21, and one time with respect to the user client terminal 31). Then, by referring to the content of the relay group information database 505 based on the identification ID of the relay group, the relay server R1 transmits an "updateResource message" to the relay servers R2 and R3, which define the relay group, in order to notify them of the created shared resource information 120 (including the message information 127a) (sequence numbers 31.1 and 31.2).

Having received the message, each of the relay servers R2 and R3 stores the shared resource information 120 in the respective shared resource information databases 506, and transmits an "updateResource command" to each of the specified client terminal 21 and 31 in order to notify them of the shared resource information 120 (sequence numbers 31.1.1, and 31.2.1).

Having received the "updateResource command", each of the user client terminals 21 and 31 changes the shared resource information 120 stored in the respective shared resource information databases 604. The process of changing the shared resource information 120 includes a process of adding the message information 127a created by the relay server 1 to the shared resource information 120. Then, each user client terminal 21 and 31 executes a message display command (ViewMessage method), and the message illustrated in FIG. 13 is displayed on a display of the user client terminal. The message of FIG. 13 is the text derived from the message content information 133a of FIG. 9 that is decoded by MIME. The text includes a name "workspace1", which is a space arranged to share a resource, and the account of the client terminal that created the space.

From the message, a user of each user client terminal 21 and 31 can immediately learn that the shared resource has been created by the client terminal 11. Further, as indicated in the text of FIG. 13, the message includes information regarding a message valid time period. When the valid time period elapses, the message (the message information 127a) is automatically deleted.

Figure 12:
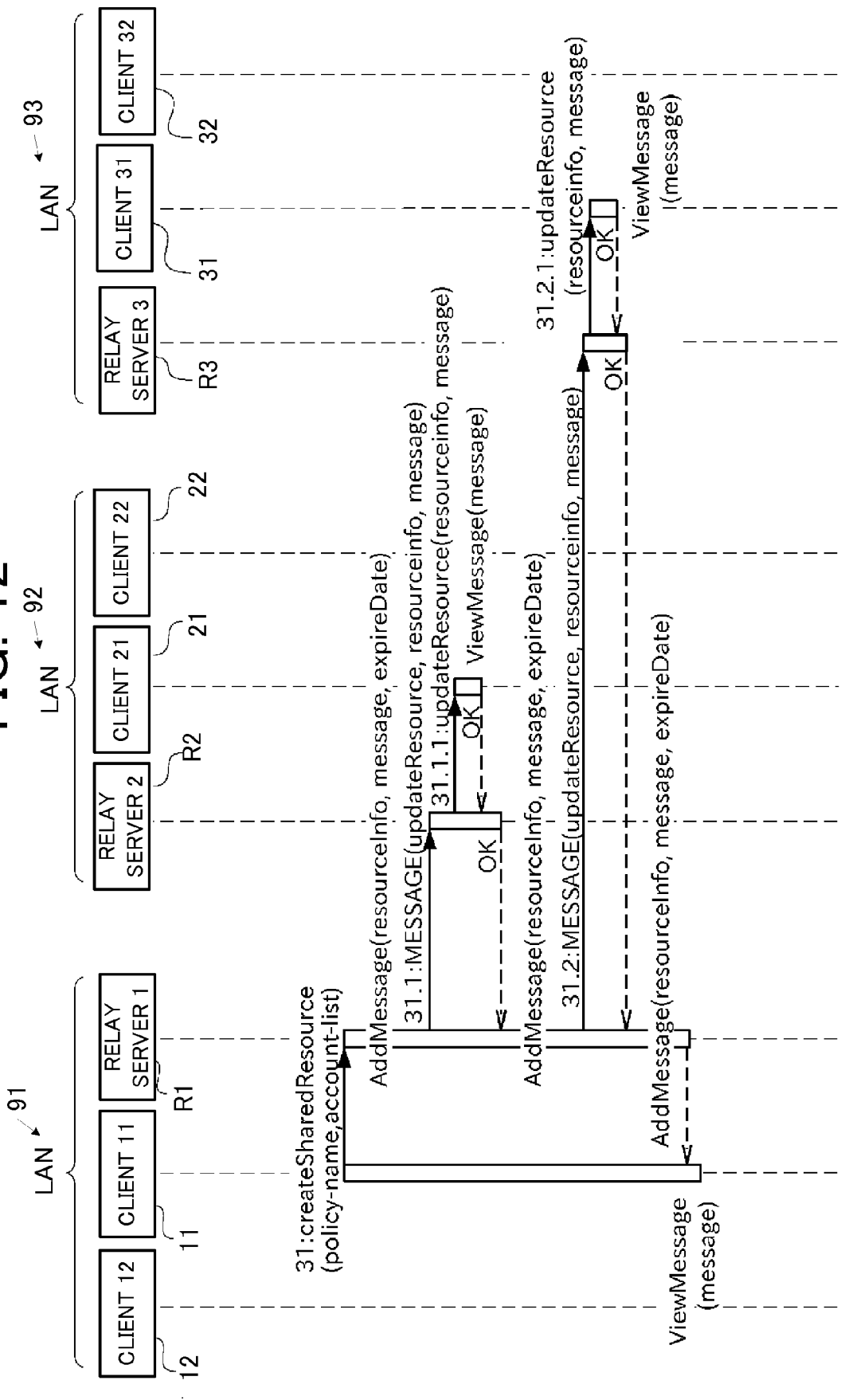
FIG. 12 is a sequence chart illustrating a communication process of forming a virtual space for resource sharing in the relay group so that a shared resource can be added according to a preferred embodiment of the present invention.

Then, as illustrated in FIG. 12, the user client terminals 21 and 31 respectively return an OK response to the relay servers R2 and R3, which are transmission sources. Having received the OK response, each relay server R2 and R3 returns an OK response to the relay server R1. Then, the relay server R1 again executes a message adding command (AddMessage method), and notifies the client terminal 11 of the message information 127a. Having received the notification, the client terminal 11 adds the message information 127a to the shared resource information 120, and executes a ViewMessage method. Accordingly, the message of FIG. 13 is displayed on the display of the client terminal 11.

Thus, the shared resource identification information 123, the family account information 124, and the message information 127a have been described in the shared resource information 120 stored in the shared resource information database 506 of each relay server R1, R2, and R3 and in the shared resource information 120 stored the shared resource information database 604 of each client terminal 11, 21, and 31.

Then, when an AddResource method is executed by an operation by the user of the client terminal 11, a process of adding resource information (reference numeral 126 of FIG. 8) indicating the shared resource to the shared resource information 120 is performed. In this example, the file "order.doc" is selected from the resources stored in the resource storage unit 603 of the client terminal 11, and specified to be shared by the client terminals 21 and 31. Moreover, a name "file00ZY.doc" is specified for sharing the file.

Figure 14:
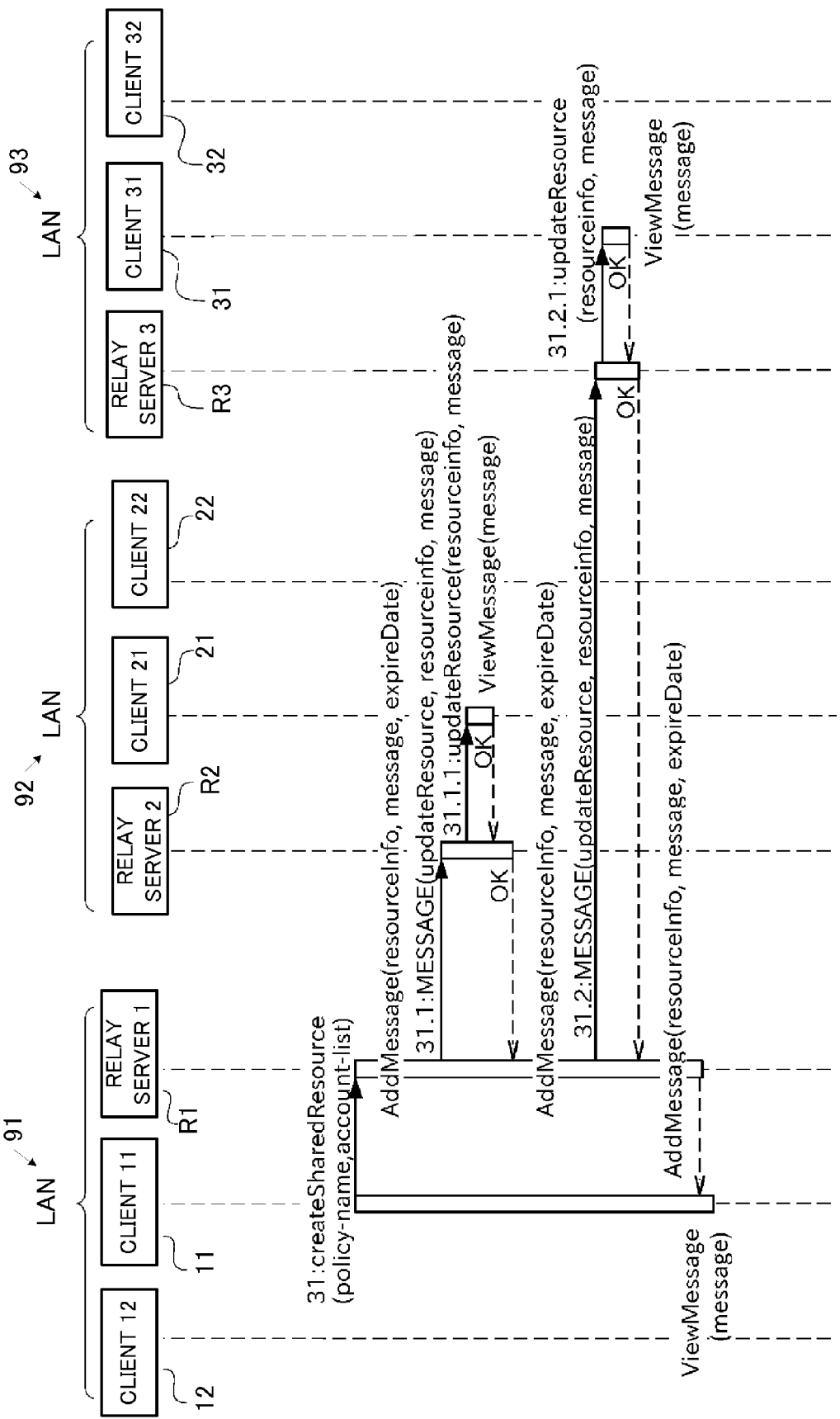
FIG. 14 is a sequence chart illustrating a communication process of actually sharing a resource according to a preferred embodiment of the present invention.

Having received such specification, the client terminal 11 transmits, to the relay server R1, a shared resource change request (updateSharedResource command) including the specified information (sequence number 32 of FIG. 14). Having received the shared resource change request, the relay server R1 stores the changed shared resource information in the shared resource information database 506 thereof. Then, an automatic message adding command (AddMessage method) is executed in the relay server R1, and message information 127b regarding a text message indicating that the shared resource has been changed is created. The AddMessage method is executed with respect to each user client terminal 21 and 31. The relay server R1 transmits an addResource message to each relay server R2 and R3, which respectively are connected to the user client terminals 21 and 31, and notifies them of the changed shared resource information 120 (including the message information 127b) (sequence numbers 32.1 and 32.2).

Having received the message, the relay servers R2 and R3 store the shared resource information 120 in the respective shared resource information databases 506. Moreover, each relay server R2 and R3 transmits the addResource command to each of the specified user client terminals 21 and 31, and reflects the change of the shared resource information 120 (sequence numbers 32.1.1, and 32.2.1).

Having received the addResource command, each user client terminal 21 and 31 changes the shared resource information 120 stored in the respective shared resource information databases 604. The process of changing the shared resource information 120 includes a process of adding the message information 127b created by the relay server 1 to the shared resource information 120. Then, a message display command (ViewMessage method) is executed in each user client terminal 21 and 31, and a message illustrated in FIG. 15 is displayed on the display of the client terminal. The message of FIG. 15 is the text derived from the message content information 133b of FIG. 9 that is encoded by MIME. From the message, the user of each user client terminal 21 and 31 can immediately learn that the file "file00ZY.doc" has been added to the shared resources by the client terminal 11.

Then, the user client terminal 21 and 31 respectively return an OK response to the relay servers R2 and R3, which are the transmission sources. Having received the OK response, the relay servers R2 and R3 return an OK response to the relay server R1. Then, the relay server R1 again executes an AddMessage method, creates the message information 127b regarding the text message indicating that the shared resource has been changed, and then notifies the client terminal 11. The client terminal 11 adds the message information 127b to the shared resource information 120, and executes a ViewMessage method. Accordingly, the message of FIG. 15 is also displayed on the display of the client terminal 11.

Thus, the resource information 126 (refer to FIG. 8) regarding the file "file00ZY.doc" is added to the shared resource information 120. Although a detailed description will be omitted, a process of adding each file indicated in the resource information 126 of FIG. 8 to the shared resource information 120 is performed.

Next, with reference to FIG. 16, a process of automatically deleting, in response to the elapse of the valid time period, the message that is automatically added as described above will be described. Having automatically created and added the message as described above, the relay server R1 monitors the message information 127 every prescribed period of time, and checks whether or not any automatic message has the prescribed valid time period elapsed from its creation date. As illustrated in FIG. 13 or 15, the valid time period is set to be three days, for example, however, any other desirable time period can be set.

Figure 16:
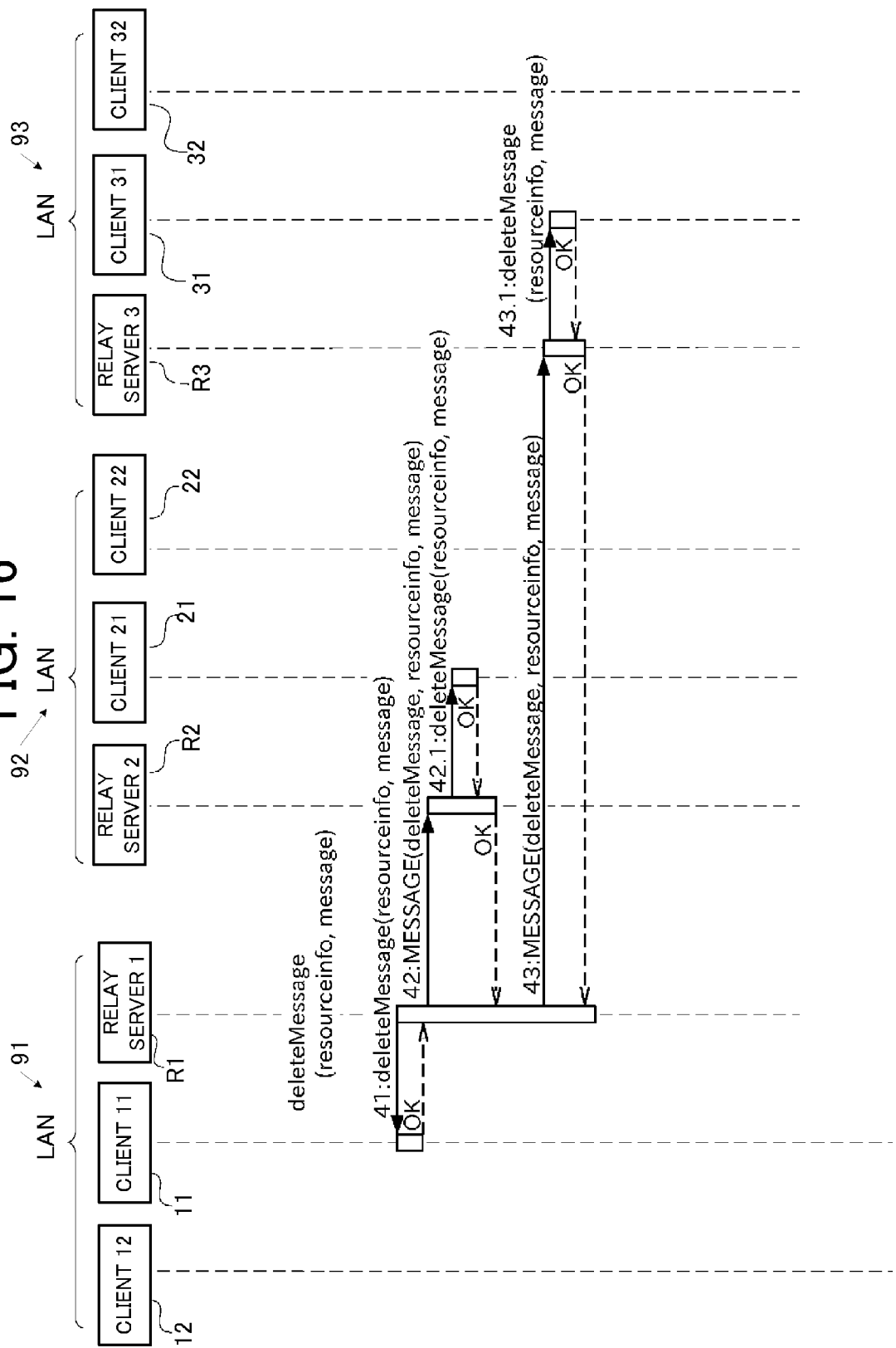
FIG. 16 is a sequence chart illustrating a communication process of automatically deleting old notifying messages according to a preferred embodiment of the present invention.

When there is an automatic message that has its valid time period elapsed, as illustrated in FIG. 16, a deleteMessage method is executed in the relay server R1. The relay server R1 sends the deleteMessage command to the client terminal 11. Having received the command, the client terminal 11 deletes the message information 127 regarding the message from the shared resource information 120.

Subsequently, the relay server R1 transmits a deleteMessage message to each relay server R2 and R3, which is connected to the user client terminal 21 or 31, and notifies them of a message deletion request (sequence numbers 42 and 43). Having received the message, each relay server R2 and R3 deletes the message information 127 regarding the message from the shared resource information 120 stored in the respective shared resource information databases 506. Moreover, each relay server R2 and R3 transmits a deleteMessage command to each of the specified user client terminal 21 and 31, and instructs them to delete the message information 127 from the shared resource information 120 (sequence numbers 43.1 and 43.2). Thus, the message information 127 regarding the old message can be automatically deleted.

Figure 17:
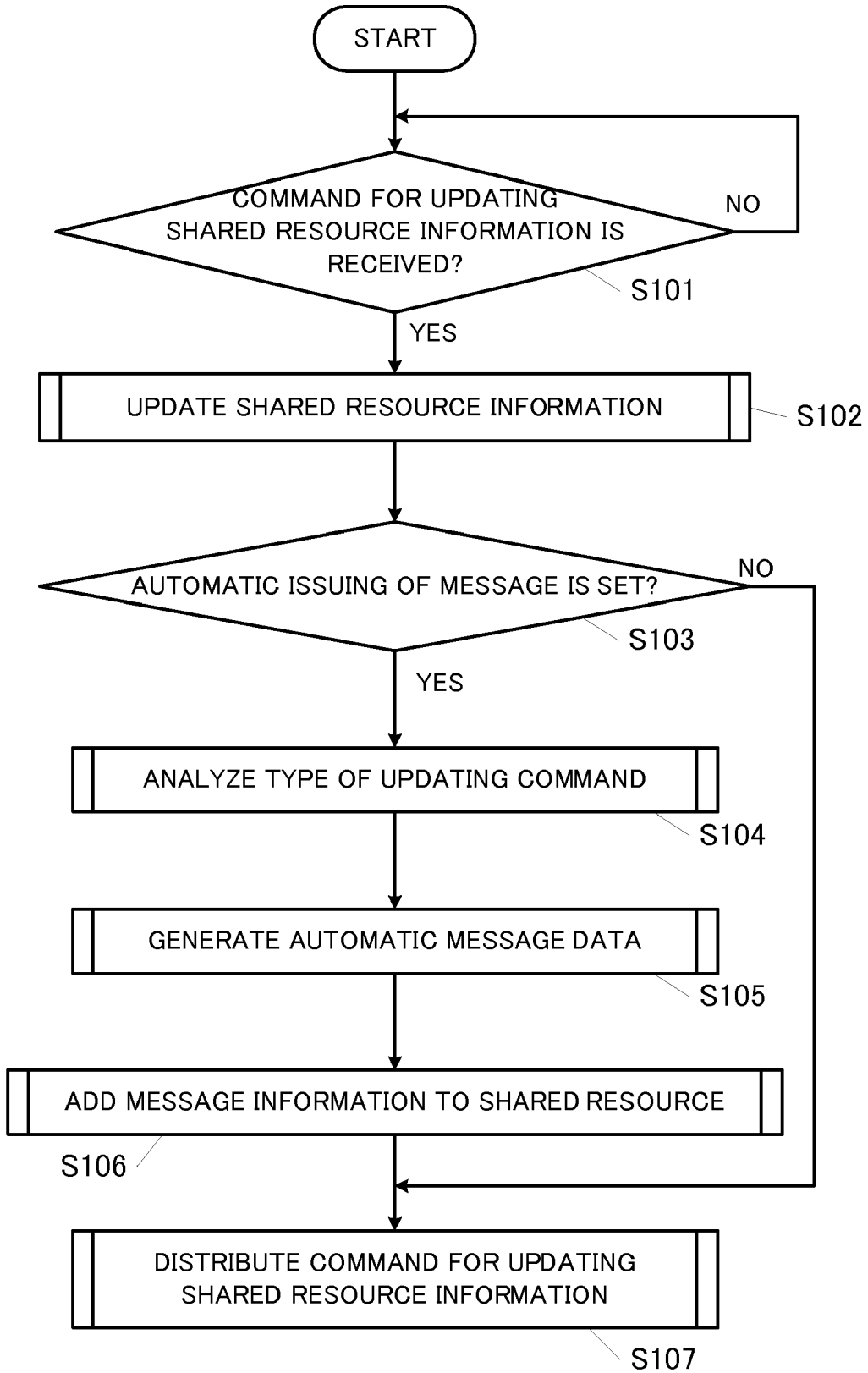
FIG. 17 is a flowchart of a process in which the relay server automatically adds a notifying message according to a preferred embodiment of the present invention.

With reference to FIG. 17, an operation performed by the relay server 1 will be described in detail. FIG. 17 is a flowchart illustrating an operation performed by the relay server 1 in the relay communication system according to a preferred embodiment of the present invention.

As illustrated in FIG. 17, the relay server 1 waits until a command for updating the shared resource information is received (S101), and when the updating command is received, the relay server 1 updates the shared resource information 120 stored in the shared resource information database 506 thereof (S102).

Next, the relay server 1 checks whether or not it has been specified to automatically issue a message (S103). When it has been specified to automatically issue the message, the relay server 1 analyzes a type of the command for updating the shared resource information (i.e., analyzes whether or not the command is a createSharedResource command for creating a shared resource, or an updateSharedResource command for actually adding the shared resource, or the like) (S104). Accordingly, based on an analysis result thereof, the relay server 1 creates data about the automatically sent message (S105).

FIG. 18 illustrates a content of a model table that is used to create the data about the automatic message. In other words, the content corresponding to the table of FIG. 18 is stored in a suitable storage unit of the relay server 1 according to the preferred embodiment of the present invention. In the process of S105, a model is determined based on the table in accordance with the type of the updating command acquired in the analyzing process of S104. Further, by providing prescribed information in a portion bracketed off by, for example, "<$ . . . $>" in the model, the data about the automatically sent message is created as illustrated in FIG. 13, etc. A process of acquiring the valid time period of the message based on the table of FIG. 18 is also performed in the message creating process of S105.

Then, the relay server 1 adds the message information 127 regarding the created automatically sent message to the shared resource information 120 (S106 of FIG. 17), and distributes the shared resource information 120 including the added message information 127 to the other relay servers 1 or to the client terminals 5 connected to the relay server 1 that distributes the shared resource information 120 (S107).

When the shared resource is updated by the operation of the client terminal 5 in the above-described processes, the relay server 1 automatically sends a prescribed notifying message to the other client terminals. Accordingly, the client terminal 5 that has updated the shared resource can immediately notify the other client terminals 5 of the change of the shared resource without performing special operations.

As described above, the relay server 1 of the present preferred embodiment includes the relay group information database 505 arranged to store the relay group information 100, the shared resource information database 506, and the control unit 503. The relay group includes the other relay servers 1 that can be connected to the relay server 1. The shared resource information database 506 stores the shared resource information 120 when sharing the resource with the plurality of client terminals 5 in the relay group. The shared resource information 120 includes the family resource information 125, which is the information about the resource, the family account information 124, which is the information about the account of the client terminal that shares the resource, and the message information 127, which is related to the message that is exchanged among the plurality of client terminals 5. As illustrated in FIGS. 12 and 14, the control unit 503 of the relay server R1 delivers, to the other relay servers R2 and R3, an instruction for handling the shared resource registered in the shared resource information database 506, such as an instruction for adding the shared resource. The control unit 503 of the relay servers R2 and R3 respectively delivers, to the client terminals 21 and 31, an instruction for handling the shared resource and an instruction for adding the message. Furthermore, when the family resource information 125 is changed, or when the family account information 124 is changed, the control unit 503 of the relay server R1 adds, to the shared resource information 120, the message information 127 regarding a message notifying such change. As illustrated in FIG. 14, a case in which the shared resource is added can be pointed to as an example of changing the family resource information 125. As illustrated in FIG. 12, a case in which a virtual space for resource sharing is created, and it becomes possible to add the shared resource to the shared resource information 120, can be pointed to as an example of changing the family account information 124.

With the above-described configuration, the resources can be shared by the plurality of desired client terminals 5 via the relay servers 1, the messages can be exchanged, and the messages and the shared resources can be managed in an integrated manner easily. Moreover, when the shared resource is handled, or the like, by the client terminal 11, the notifying message is automatically sent to the relay server R1. Therefore, the other client terminals 21 and 31 can be notified of such handling of the shared resource without requiring special operations.

In the present preferred embodiment, when creating the virtual space to add the shared resources (FIG. 12), the client terminal 11 can instruct whether or not to send the message indicating such addition. Moreover, when adding the shared resource (FIG. 14), the client terminal 11 can also give such instructions.

With the above-described configuration, both the case in which the client terminal 5 desires to notify the other client terminals of the handling of the shared resource and the case in which such notifications are not necessarily required, for example, can be appropriately dealt with.

After the valid time period (for example, three days) elapses from a time when the message information 127 regarding the notifying message is added to the shared resource information 120, as illustrated in FIG. 16, the control unit 503 of the relay server R1 automatically deletes the message information 127.

With the above-described configuration, even when the client terminal 5 frequently handles the shared resources, resulting in a great number of notifying messages, the old notifying message having its appropriate time period elapsed is automatically deleted by the relay server R1. As a result, a great number of messages having less importance due to the elapse of the long time period can be prevented from being accumulated, thereby complication can be avoided.

Further, when the virtual space arranged to facilitate resource sharing is created so that the shared resource can be added to the shared resource information 120 (FIG. 12), and when the shared resource is added (FIG. 14), the control unit of the relay server R1 adds, to the shared resource information 120, the message information 127 regarding the message notifying such additions.

With the above-described configuration, when a resource becomes sharable, and when the resource is actually shared, the other client terminals 5 are immediately notified of such resource sharability or resource sharing. Thus, cooperative work (joint operations) can be smoothly and effectively achieved via the resource sharing among the plurality of client terminals 5.

Preferred embodiments of the present invention have been described, however, the above-described configuration may be modified in many various ways including the examples described below.

In the above-described preferred embodiments, the communication between each relay server 1 is preferably performed through the external server 2, which is a SIP server, however, in place of such a configuration, the communication may be directly performed between the relay servers 1 without through the external server 2.

The relay server 1 can automatically issue the notifying message not only when it becomes possible to add the shared resource to the shared resource information 120 and when the shared resource is added but also when the shared resource is deleted or changed by being overwritten (i.e., when the shared resource is updated), for example. Furthermore, the relay server 1 can also automatically issue the notifying message when the family account information 124 is changed due to additional registration or registration deletion of the client terminal 5 that shares the resource, and when the relay group information 100 is changed due to additional registration or registration deletion, or the like, of the relay server 1 that forms the relay group.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A relay server connected to a first LAN and arranged to communicate via a WAN with another relay server connected to a second LAN, the relay server comprising:

an account information registration unit arranged to store account information about a client terminal connected to the first LAN;
a relay group information registration unit arranged to store relay group information including information about the relay server and the another relay server and account information about a client terminal connected to each of the relay server and the another relay server via the first and second LANs, respectively;
a shared resource information registration unit arranged to store shared resource information including:
the name of a file or a folder defining a resource;
information about an owner client terminal which is a client terminal capable of operating the resource;
information about resource sharing client terminals that share the resource; and
message information about a notification message to be exchanged between the resource sharing client terminals;
an operation instruction relay processing unit arranged to, when receiving an operation instruction for the resource from one of the resource sharing client terminals, specify the owner client terminal based on the shared resource information, specify a relay server connected to the specified owner client terminal based on the relay group information; and relay the operation instruction to the specified relay server; and
a control unit arranged to, when receiving the operation instruction for the resource from the one of the resource sharing client terminals, add to the shared resource information, information about the one of the resource sharing client terminals and notification message information about the operation instruction for the resource, and notify at least another one of the resource sharing client terminals of the addition of the notification message information.

2. The relay server according to claim 1, wherein the control unit is arranged to instruct whether or not to add the notification message information based on the operation instruction received from the one of the resource sharing client terminals.

3. The relay server according to claim 1, wherein after a prescribed time period has elapsed from a time when the notification message information was added to the shared resource information, the control unit is arranged to automatically delete the notification message information.

4. The relay server according to claim 2, wherein after a prescribed time period has elapsed from a time when the notification message information was added to the shared resource information, the control unit is arranged to automatically delete the notification message information.

5. The relay server according to claim 1, wherein when a resource is made sharable or is shared by the one of the resource sharing client terminals, the control unit is arranged to add notification message information about such resource sharability or resource sharing to the shared resource information.

6. The relay server according to claim 2, wherein when a resource is made sharable or is shared by the one of the resource sharing client terminals, the control unit is arranged to add notification message information about such resource sharability or resource sharing to the shared resource information.

7. The relay server according to claim 3, wherein when a resource is made sharable or is shared by the one of the resource sharing client terminals, the control unit is arranged to add notification message information about such resource sharability or resource sharing to the shared resource information.

8. The relay server according to claim 4, wherein when a resource is made sharable or is shared by the one of the resource sharing client terminals, the control unit is arranged to add notification message information about such resource sharability or resource sharing to the shared resource information.

9. A relay communication system comprising:
a plurality of relay servers; wherein
each relay server is connected to a first LAN and arranged to communicate via a WAN with another relay server connected to a second LAN, each relay server includes:
an account information registration unit arranged to store account information about a client terminal connected to the first LAN;
a relay group information registration unit arranged to store relay group information including information about the relay server and the another relay server and account information about a client terminal connected to each of the relay server and the another relay server connected to each of the relay server and the another relay server via the first and second LANs, respectively;
a shared resource information registration unit arranged to store shared resource information including:
the name of a file or a folder defining a resource;
information about an owner client terminal which is a client terminal capable of operating the resource;
information about resource sharing client terminals that share the resource; and
message information about a notification message to be exchanged between the resource sharing client terminals;
an operation instruction relay processing unit arranged to, when receiving an operation instruction for the resource from one of the resource sharing client terminals, specify the owner client terminal based on the shared resource information, specify a relay server connected to the specified owner client terminal based on the relay group information; and relay the operation instruction to the specified relay server; and
a control unit arranged to, when receiving the operation instruction for the resource from the one of the resource sharing client terminals, add to the shared resource information, information about the one of the resource sharing client terminals and notification message information about the operation instruction about the resource, and notify at least another one of the resource sharing client terminals of the addition of the notification message information.

10. The relay communication system according to claim 9, wherein the control unit is arranged to instruct whether or not to add the notification message information based on the operation instruction received from the one of the resource sharing client terminals.

11. The relay communication system according to claim 9, wherein after a prescribed time period has elapsed from a time when the notification message information was added to the shared resource information, the control unit is arranged to automatically delete the notification message information.

12. The relay communication system according to claim 9, wherein when a resource is made sharable or is shared by the one of the resource sharing client terminals, the control unit is arranged to add notification message information about such resource sharability or resource sharing to the shared resource information.

* * * * *